US012047734B2

(12) United States Patent
Kim et al.

(10) Patent No.: US 12,047,734 B2
(45) Date of Patent: Jul. 23, 2024

(54) ACOUSTIC TRANSDUCER AND ELECTRONIC DEVICE HAVING SLIM SPEAKER

(71) Applicant: Samsung Electronics Co., Ltd., Suwon-si (KR)

(72) Inventors: Kidu Kim, Suwon-si (KR); Jongyuk Lee, Suwon-si (KR); Kyounghwan Kim, Suwon-si (KR); Kwangyoun Kim, Suwon-si (KR); Suho Jo, Suwon-si (KR); Jonghun Ha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 141 days.

(21) Appl. No.: 17/650,974

(22) Filed: Feb. 14, 2022

(65) Prior Publication Data

US 2022/0174396 A1 Jun. 2, 2022

Related U.S. Application Data

(63) Continuation of application No. PCT/KR2020/010715, filed on Aug. 13, 2020.

(30) Foreign Application Priority Data

Aug. 14, 2019 (KR) ........................ 10-2019-0099620
Jul. 3, 2020 (KR) ........................ 10-2020-0082369

(51) Int. Cl.
*H04R 25/00* (2006.01)
*H04R 1/02* (2006.01)
(Continued)

(52) U.S. Cl.
CPC ............ *H04R 1/2803* (2013.01); *H04R 1/02* (2013.01); *H04R 9/046* (2013.01); *H04R 9/06* (2013.01); *H04R 2499/15* (2013.01)

(58) Field of Classification Search
CPC ...... H04R 2499/15; H04R 1/02; H04R 1/025; H04R 1/026; H04R 1/2803; H04R 5/02;
(Continued)

(56) References Cited

U.S. PATENT DOCUMENTS 5,903,656 A * 5/1999 D'Hoogh ............ H04R 1/2834 381/403
6,807,051 B2 10/2004 Takahashi
(Continued)

FOREIGN PATENT DOCUMENTS

JP H11-205880 A 7/1999
JP 2003-174692 A 6/2003
(Continued)

OTHER PUBLICATIONS

International Search Report and Written Opinion of the International Searching Authority dated Nov. 23, 2020, in connection with International Application No. PCT/KR2020/010715, 13 pages.
(Continued)

*Primary Examiner* — Phylesha Dabney

(57) ABSTRACT

An electronic device includes: a case in which a display is mounted on the front surface thereof; a slim speaker mounted on the rear surface of the case; and a rear cover mounted on the rear surface of the case to cover the slim speaker. The slim speaker includes: an acoustic transducer for generating sound; and an enclosure fixed to the rear cover and having the acoustic transducer mounted therein. The enclosure includes an open upper side on the front surface of the enclosure, and includes: a sound guide groove which exposes a vibration plate of the acoustic transducer and guides the generated sound generated by the vibration plate; an enclosure groove including an open upper side on the rear surface of the enclosure and surrounding the acoustic transducer; and a sound discharge port formed on a side
(Continued)

surface of the enclosure and in communication with the sound guide groove.

15 Claims, 20 Drawing Sheets

(51) Int. Cl.
*H04R 1/28* (2006.01)
*H04R 9/04* (2006.01)
*H04R 9/06* (2006.01)

(58) Field of Classification Search
CPC .......... H04R 9/046; H04R 9/06; H04R 1/028; H04R 1/24; H04R 1/2826; H04R 17/00; H04R 2201/025; H04R 2499/11; H04R 5/04; H04R 7/045
USPC .......................................................... 381/345
See application file for complete search history.

(56) References Cited

U.S. PATENT DOCUMENTS

| | | | |
|---|---|---|---|
| 7,298,862 | B2 | 11/2007 | Dedieu et al. |
| 8,351,631 | B2 | 1/2013 | Lee et al. |
| 8,767,999 | B2 | 7/2014 | Shin |
| 9,609,438 | B2 | 3/2017 | Kim et al. |
| 10,178,467 | B2 | 1/2019 | Hou et al. |
| 10,299,033 | B2 | 5/2019 | Yang et al. |
| 2010/0150390 | A1 | 6/2010 | Nishiyama et al. |
| 2014/0301587 | A1 | 10/2014 | Ji et al. |
| 2020/0245062 | A1 | 7/2020 | Son et al. |
| 2021/0200504 | A1 | 7/2021 | Park et al. |

FOREIGN PATENT DOCUMENTS

| | | | |
|---|---|---|---|
| JP | 4415882 | B2 | 2/2010 |
| KR | 10-1997-0058251 | A | 7/1997 |
| KR | 10-0335172 | B1 | 5/2002 |
| KR | 20-0401086 | Y1 | 11/2005 |
| KR | 10-2011-0010999 | A | 2/2011 |
| KR | 10-1046005 | B1 | 7/2011 |
| KR | 10-1062039 | B1 | 9/2011 |
| KR | 10-1197917 | B1 | 11/2012 |
| KR | 10-1525105 | B1 | 6/2015 |
| KR | 10-2016-0035851 | A | 4/2016 |
| KR | 10-1633679 | B1 | 6/2016 |
| KR | 10-1834304 | B1 | 3/2018 |
| KR | 10-2019-0040608 | A | 4/2019 |
| KR | 10-1966563 | B1 | 4/2019 |
| KR | 10-2021-0086133 | A | 7/2021 |

OTHER PUBLICATIONS

Office Action issued Apr. 22, 2024, in connection with Korean Patent Application No. 10-2020-0082369, 12 pages.

* cited by examiner

ACOUSTIC TRANSDUCER AND ELECTRONIC DEVICE HAVING SLIM SPEAKER

CROSS-REFERENCE TO RELATED APPLICATIONS

This application is a bypass continuation of International Application No. PCT/KR2020/010715, filed Aug. 13, 2020, which claims priority to Korean Patent Application No. 10-2019-0099620, filed Aug. 14, 2019, and Korean Patent Application No. 10-2020-0082369, filed Jul. 3, 2020, the disclosures of which are herein incorporated by reference in their entirety.

BACKGROUND

1. Field

The disclosure relates to an acoustic transducer and an electronic device having the same, and more particularly, to an acoustic transducer that can be disposed in an electronic device and an electronic device having a slim speaker.

2. Description of Related Art

With the development of electronic technology, electronic devices are becoming thinner and thinner.

In particular, the thickness of portable electronic devices such as smart phones and tablet computers and display devices such as TVs and monitors is becoming thinner. In general, a portable electronic device or a display device includes a speaker to reproduce sound. Accordingly, in order to reduce the thickness of the portable electronic device or the display device, it is a challenge to reduce the size of the speaker.

In addition, it is a trend to make the overall size as small as possible while increasing the capacity of home appliances such as washing machines and refrigerators. While home appliances are also becoming intelligent, a speaker capable of outputting information related to the operation of the home appliance in sound is provided in a control pad that controls the home appliance. Accordingly, in order to reduce the size of the home appliance, it is a challenge to reduce the size of the control pad, and thus, it is a challenge to reduce the size of the speaker disposed in the control pad.

However, because the speaker generates sound by vibration of the diaphragm, the amplitude of the diaphragm needs to be maintained at a predetermined value or more.

Therefore, when the thickness of the electronic device is reduced, it is a challenge to reduce the thickness of the electronic device in which the speaker is disposed while maintaining the height of the space in which the diaphragm of the speaker can vibrate as much as possible.

SUMMARY

The disclosure has been made in view of the above problems, and relates to an electronic device having a slim speaker capable of minimizing thickness.

In addition, the disclosure relates to an acoustic transducer capable of minimizing thickness and providing a damping effect to improve the performance thereof.

According to an aspect of the disclosure, an acoustic transducer may include a diaphragm provided with a voice coil; a yoke provided with a permanent magnet configured to operate the voice coil; and a frame including an accommodating groove in which the diaphragm is disposed and a plurality of fixing holes, and formed by plastic injection, wherein a bottom of the accommodating groove of the frame is formed to face the diaphragm, and the yoke is disposed in a center of the bottom of the accommodating groove, wherein a plurality of discharge holes are formed to face the diaphragm around the yoke on the bottom of the accommodating groove, and wherein the plurality of discharge holes have a size such that the accommodating groove gives a damping effect to the diaphragm.

A diameter of each of the plurality of discharge holes of the accommodating groove of the frame may be 0.6 mm to 1.0 mm.

A number of discharge holes formed in the accommodating groove of the frame may be determined such that a total area of the plurality of discharge holes is 2% to 2.2% of the area of the diaphragm.

According to an aspect of the disclosure, an electronic device having a slim speaker may include a case provided with a display disposed in a front surface thereof; a slim speaker disposed on a rear surface of the case; and a rear cover disposed on the rear surface of the case and configured to cover the slim speaker, wherein the slim speaker may include an acoustic transducer configured to generate sound; and an enclosure in which the acoustic transducer is disposed and fixed to the rear cover, wherein the enclosure may include a sound guide groove formed on a front surface of the enclosure so that an upper side of the sound guide groove is open to expose the diaphragm of the acoustic transducer, and configured to guide a sound generated by the diaphragm; an enclosure groove formed on a rear surface of the enclosure so that an upper side of the enclosure groove is open, and configured to surround the acoustic transducer; and a sound emission port formed on a side surface of the enclosure and communicating with the sound guide groove.

The enclosure may be disposed so that the upper side of the sound guide groove is covered by the rear cover, and a sound generated from a front side of the diaphragm of the acoustic transducer may be discharged to an outside of the slim speaker through the sound guide groove covered by the rear cover and the sound emission port.

The enclosure may be disposed so that the upper side of the enclosure groove is covered by the rear cover.

The rear cover may include a through hole through which a rear end of the acoustic transducer is exposed.

The rear cover and the rear end of the acoustic transducer may be located on the same plane.

The sound guide groove may be covered by a rear chassis configured to support the display.

A speaker accommodating portion corresponding to the enclosure may be provided on the rear chassis.

A sound outlet configured to communicate with the sound emission port may be provided on a side surface of the case facing the sound emission port of the enclosure.

The volume of the enclosure space covered by the rear cover may be determined by an output of the acoustic transducer.

The enclosure may include a duct that is formed on a side surface of the enclosure on one side of the sound emission port and configured to communicate with the enclosure space.

The slim speaker may include three slim speakers space apart from each other by a predetermined distance along two adjacent side surfaces of the electronic device and disposed at right angles.

The electronic device may include a plurality of control buttons or control switches disposed on the front surface of the case.

According to an aspect of the disclosure, an electronic device having a slim speaker may include a case provided with a display disposed in a front surface thereof; a rear cover disposed on a rear surface of the case; and a slim speaker disposed on the rear cover and accommodated inside the case; wherein the slim speaker may include an acoustic transducer configured to generate sound; and an enclosure in which the acoustic transducer is disposed and fixed to the rear cover, wherein the enclosure may include a sound guide groove formed on a front surface of the enclosure so that an upper side and one side of the sound guide groove are open to expose the diaphragm of the acoustic transducer; and an enclosure groove formed on a rear surface of the enclosure so that an upper side of the enclosure groove is open, and configured to surround the acoustic transducer.

With an electronic device having a slim speaker according to an embodiment of the disclosure having the structure as described above, because the upper side of the sound guide groove formed on the front surface of the enclosure and the upper side of the enclosure groove formed on the rear surface of the enclosure are open, the thickness of the slim speaker may be reduced compared to the speaker according to the prior art in which the upper side of the sound guide groove and the upper side of the enclosure groove are closed.

DETAILED DESCRIPTION

Hereinafter, embodiments of an electronic device having a slim speaker and an acoustic transducer according to the disclosure will be described in detail with reference to the accompanying drawings.

Various embodiments of the disclosure will hereinafter be described with reference to the accompanying drawings. However, it is to be understood that embodiments of the present disclosure are not limited to the described example embodiments, and include various modifications, equivalents, and/or alternatives according to embodiments of the disclosure. The matters defined herein, such as a detailed construction and elements thereof, are provided to assist in a comprehensive understanding of the present disclosure. Thus, it is apparent that example embodiments may be carried out without those defined matters. Also, well-known functions or constructions are omitted to provide a clear and concise description of example embodiments. Further, dimensions of various elements in the accompanying drawings may be arbitrarily increased or decreased for assisting in a comprehensive understanding.

The terms 'first', 'second', etc. may be used to describe diverse components, but the components are not limited by the terms. The terms may only be used to distinguish one component from the others. For example, without departing from the scope of the present disclosure, a first component may be referred to as a second component, and similarly, a second component may also be referred to as a first component.

The terms used in embodiments of the present disclosure may be construed as commonly known to those skilled in the art unless otherwise defined.

Further, the terms 'leading end', 'rear end', 'upper side', 'lower side', 'top end', 'bottom end', etc. used in the present disclosure are defined with reference to the drawings. However, the shape and position of each component are not limited by the terms.

Figure 1:
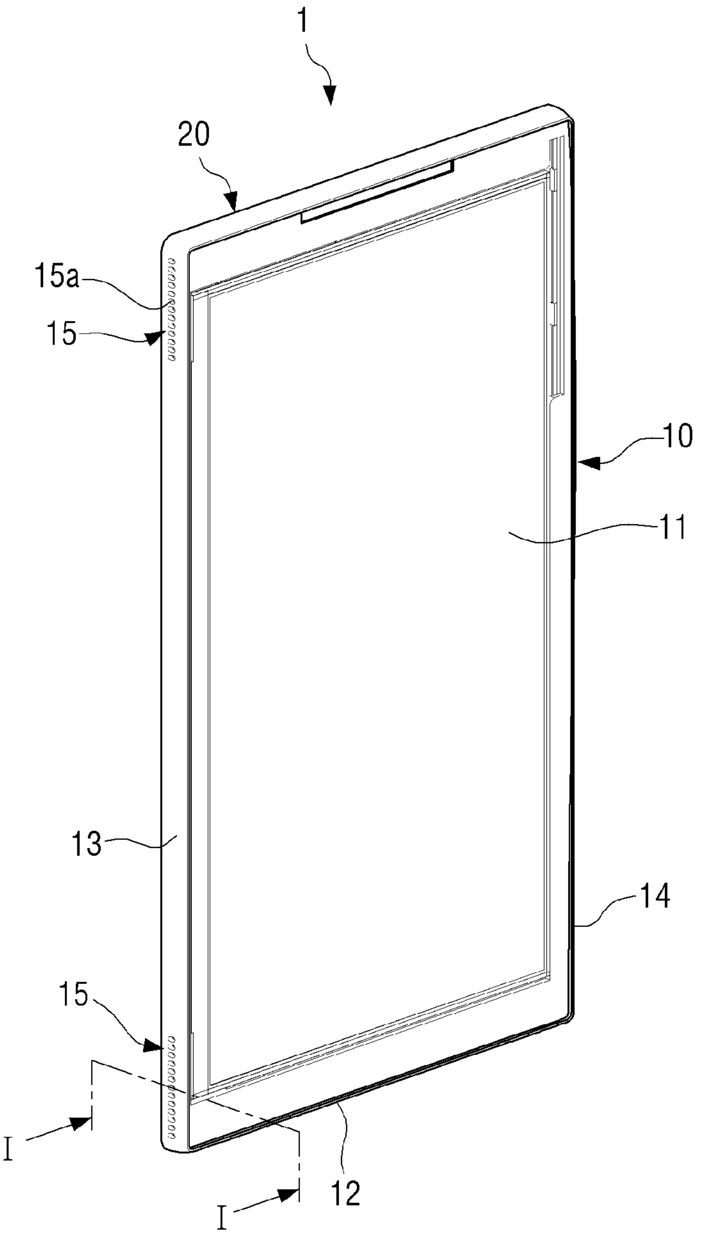
FIG. 1 is a perspective view illustrating an electronic device having a slim speaker according to an embodiment.
Figure 2:
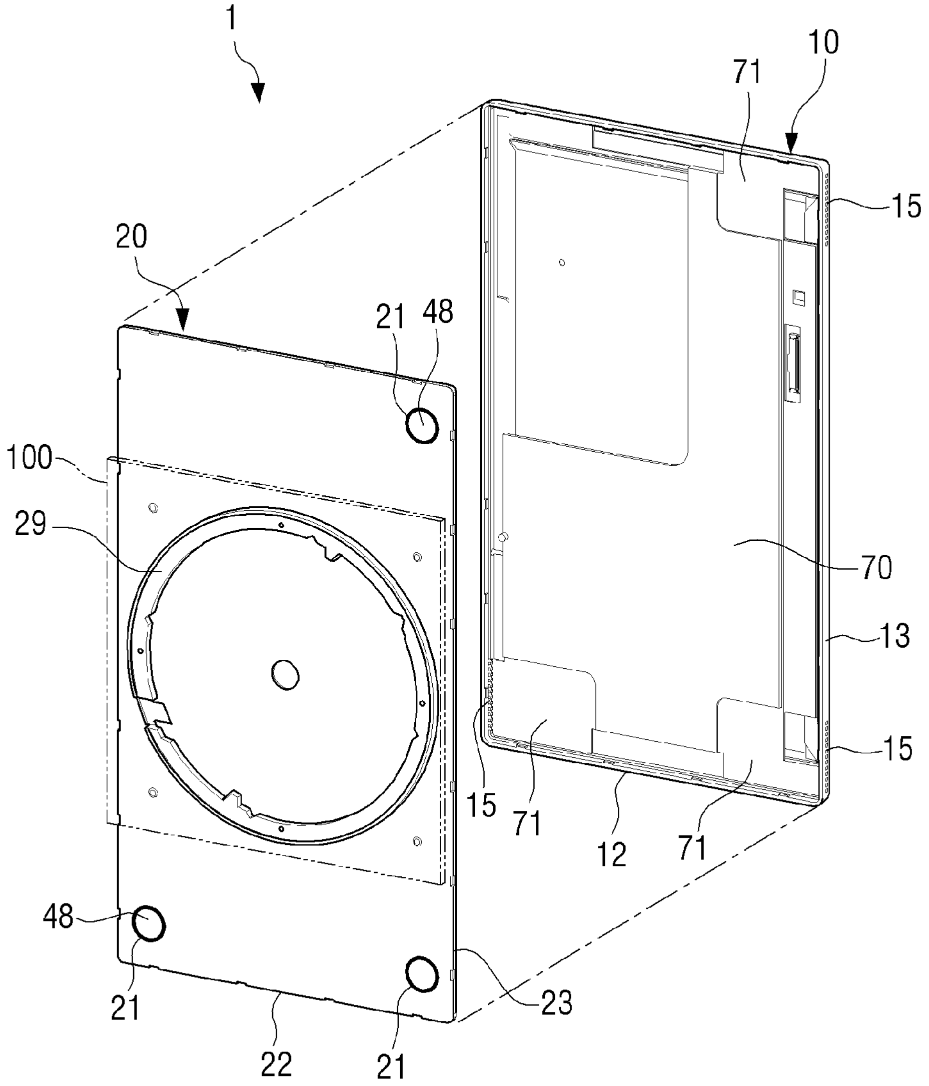
FIG. 2 is an exploded perspective view illustrating an electronic device having a slim speaker according to an embodiment in which a rear cover is separated.
Figure 3:
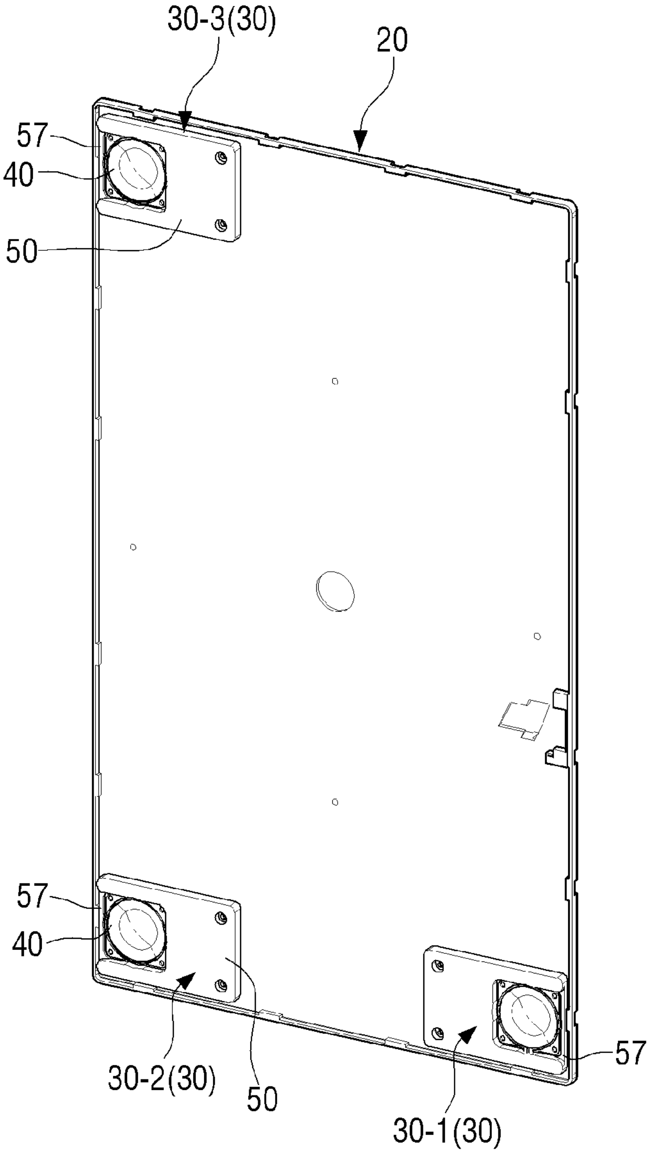
FIG. 3 is a perspective view illustrating the rear cover of the electronic device having the slim speaker of FIG. 2 viewed from another direction.
Figure 4:
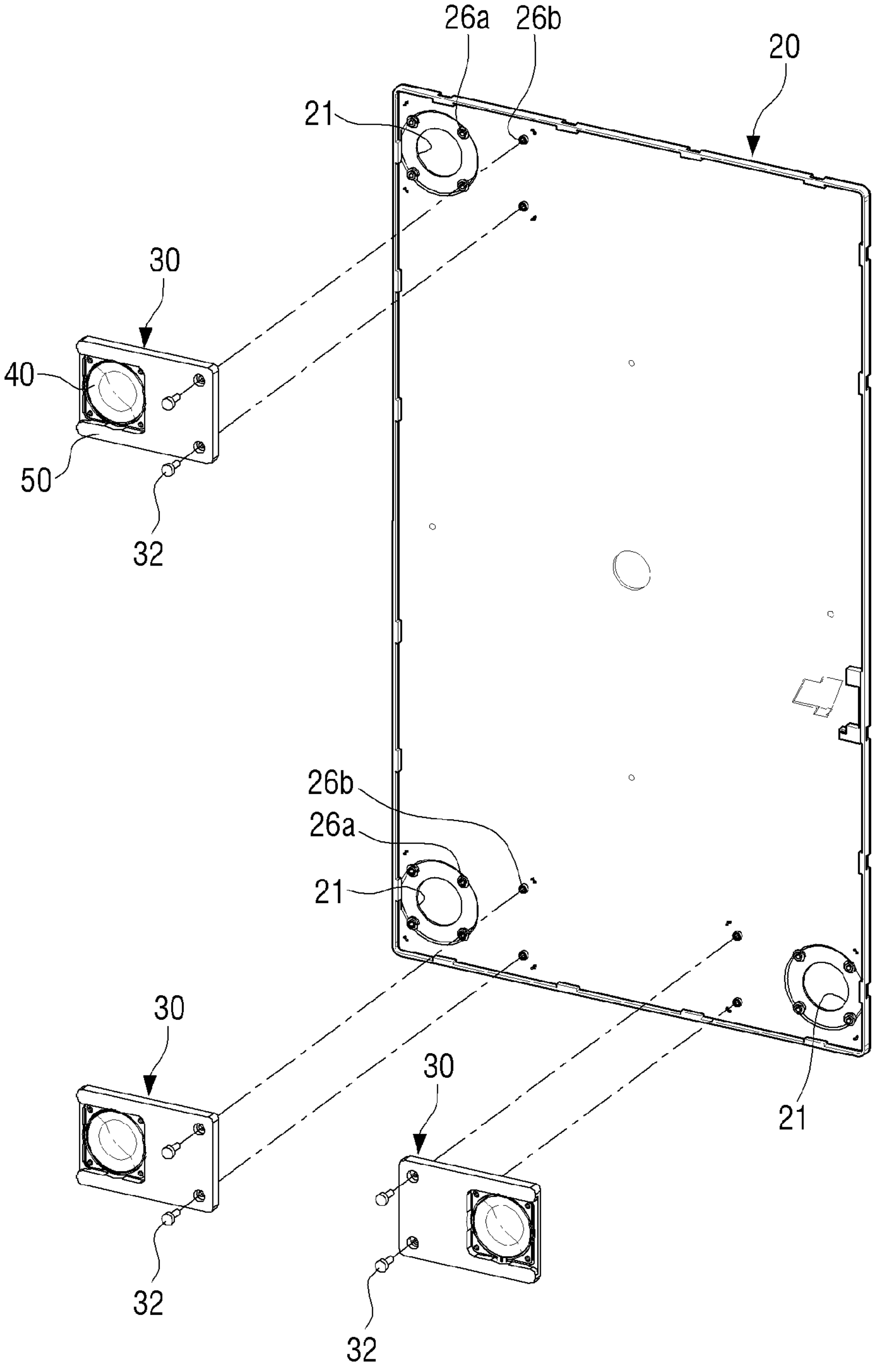
FIG. 4 is an exploded perspective view illustrating the rear cover of the electronic device having the slim speaker of FIG. 3.
Figure 5:
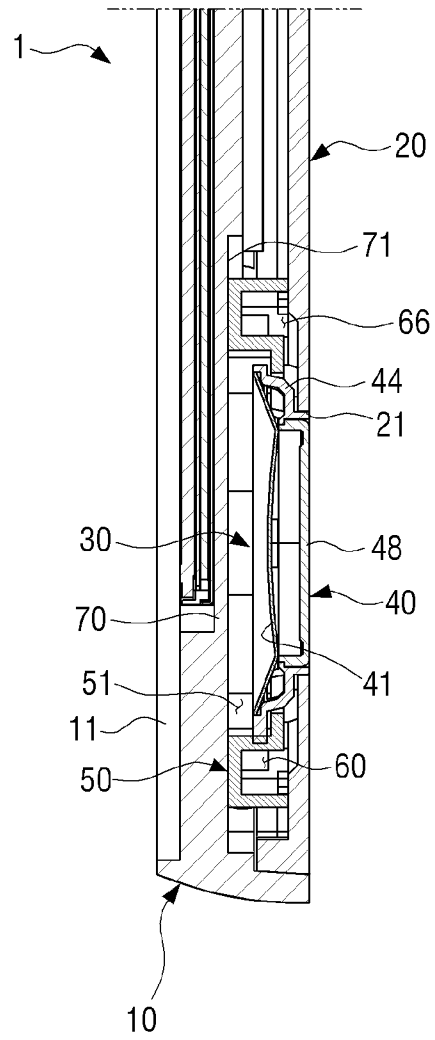
FIG. 5 is a partial cross-sectional view illustrating the electronic device having the slim speaker taken along the line I-I in FIG. 1.

FIG. 1 is a perspective view illustrating an electronic device having a slim speaker according to an embodiment. FIG. 2 is an exploded perspective view illustrating an electronic device having a slim speaker according to an embodiment in which a rear cover is separated. FIG. 3 is a perspective view illustrating the rear cover of the electronic device having the slim speaker of FIG. 2 viewed from another direction. FIG. 4 is an exploded perspective view illustrating the rear cover of the electronic device having the slim speaker of FIG. 3. FIG. 5 is a partial cross-sectional view illustrating the electronic device having the slim speaker taken along the line I-I in FIG. 1.

For reference, FIGS. 1 to 5 illustrate a tablet computer as an example of an electronic device. However, an electronic device having a slim speaker according to an embodiment of the disclosure is not limited thereto.

Referring to FIGS. 1 to 5, an electronic device 1 having a slim speaker according to an embodiment of the disclosure may include a case 10, a rear cover 20, and a slim speaker 30.

The case 10 may include a display 11 disposed on the front surface thereof. A rear chassis 70 configured to support the display 11 is provided inside the case 10. A main board, a power board, etc. included in the electronic device 1, for example, a tablet computer, may be disposed in the rear chassis 70.

The rear cover 20 is disposed on the rear surface of the case 10 and is provided to cover the slim speaker 30. Accordingly, because the slim speaker 30 disposed inside the rear surface of the case 10 is covered by the rear cover 20, the slim speaker 30 is not exposed to the outside.

The slim speaker 30 is configured to reproduce the sound output by the electronic device 1, and is disposed on the rear surface of the case 10. The front surface of the slim speaker 30 is provided with an opening for emitting a sound generated by an acoustic transducer 40, and the rear surface of the slim speaker 30 forming an enclosure 50 is open, so that the thickness of the electronic device 1 may be reduced.

The slim speaker 30 may be fixed to the rear cover 20. In this embodiment, three slim speakers 30 are disposed on the rear cover 20 as illustrated in FIGS. 3 and 4.

The three slim speakers 30 may include two slim speakers 30-1 and 30-2 disposed to be spaced apart from each other by a predetermined distance along one side 22 of the rear cover 20, that is, one side of the electronic device 1, and one slim speaker 30-3 disposed at a predetermined distance along another side 23 of the rear cover 20 perpendicular to the one side 22. For example, two slim speakers 30, that is, first and second slim speakers 30-1 and 30-2, may be disposed along the short side 22 of the rear cover 20 with a short length, and a third slim speaker 30-3 may be disposed to be spaced apart from the second slim speaker 30-2 by a predetermined distance along the long side 23 of the rear cover 20. In other words, the three slim speakers 30-1, 30-2, and 30-3 may be disposed adjacent to three corners of the rear cover 20 having a rectangular shape as illustrated in FIG. 3. Then, the three slim speakers 30 are spaced apart from each other by a predetermined distance along two adjacent and orthogonal sides of the electronic device 1 and are disposed at right angles.

Hereinafter, the structure of the slim speaker will be described in detail with reference to FIGS. 6 to 8.

Figure 6:
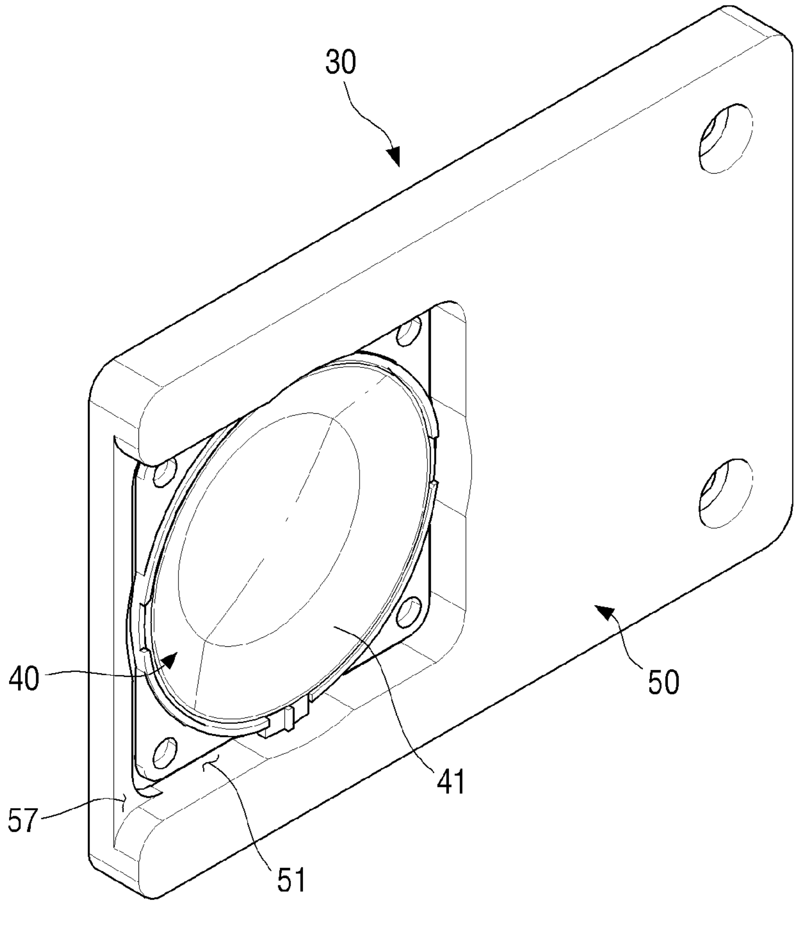
FIG. 6 is a perspective view illustrating a slim speaker used in an electronic device having a slim speaker according to an embodiment.

FIG. 6 is a perspective view illustrating a slim speaker used in an electronic device having a slim speaker according to an embodiment. FIG. 7 is a perspective view illustrating the slim speaker of FIG. 6 viewed from the opposite direction, and FIG. 8 is an exploded perspective view illustrating the slim speaker of FIG. 6.

Figure 7:
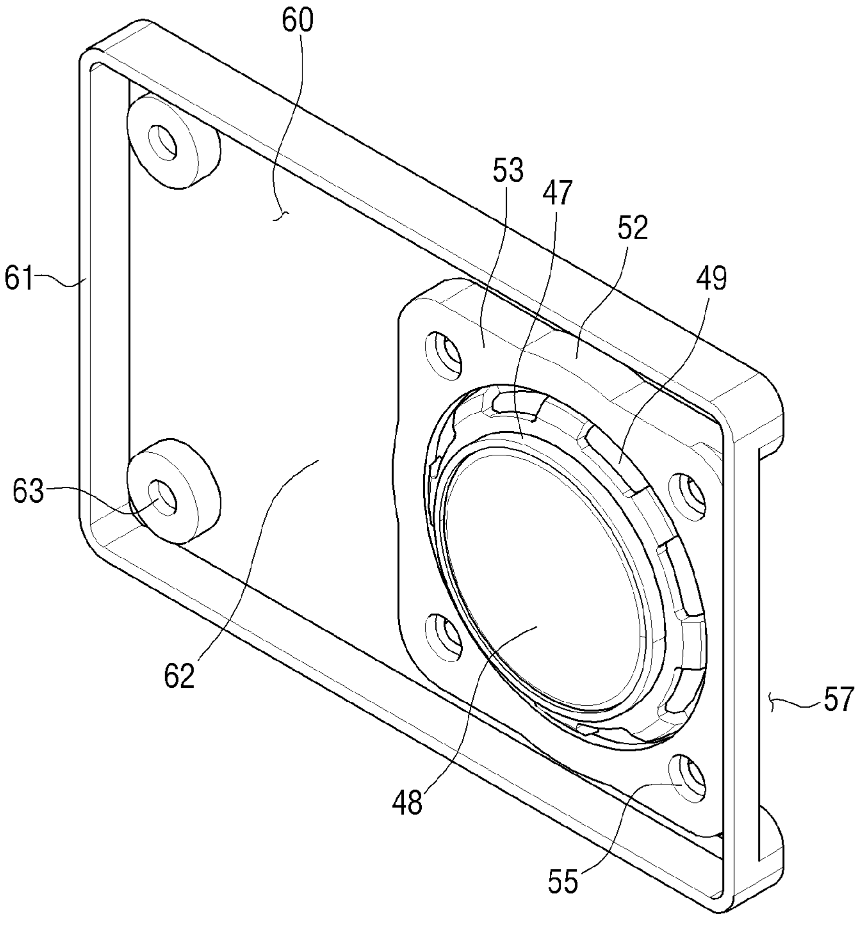
FIG. 7 is a perspective view illustrating the slim speaker of FIG. 6 viewed from the opposite direction.
Figure 8:
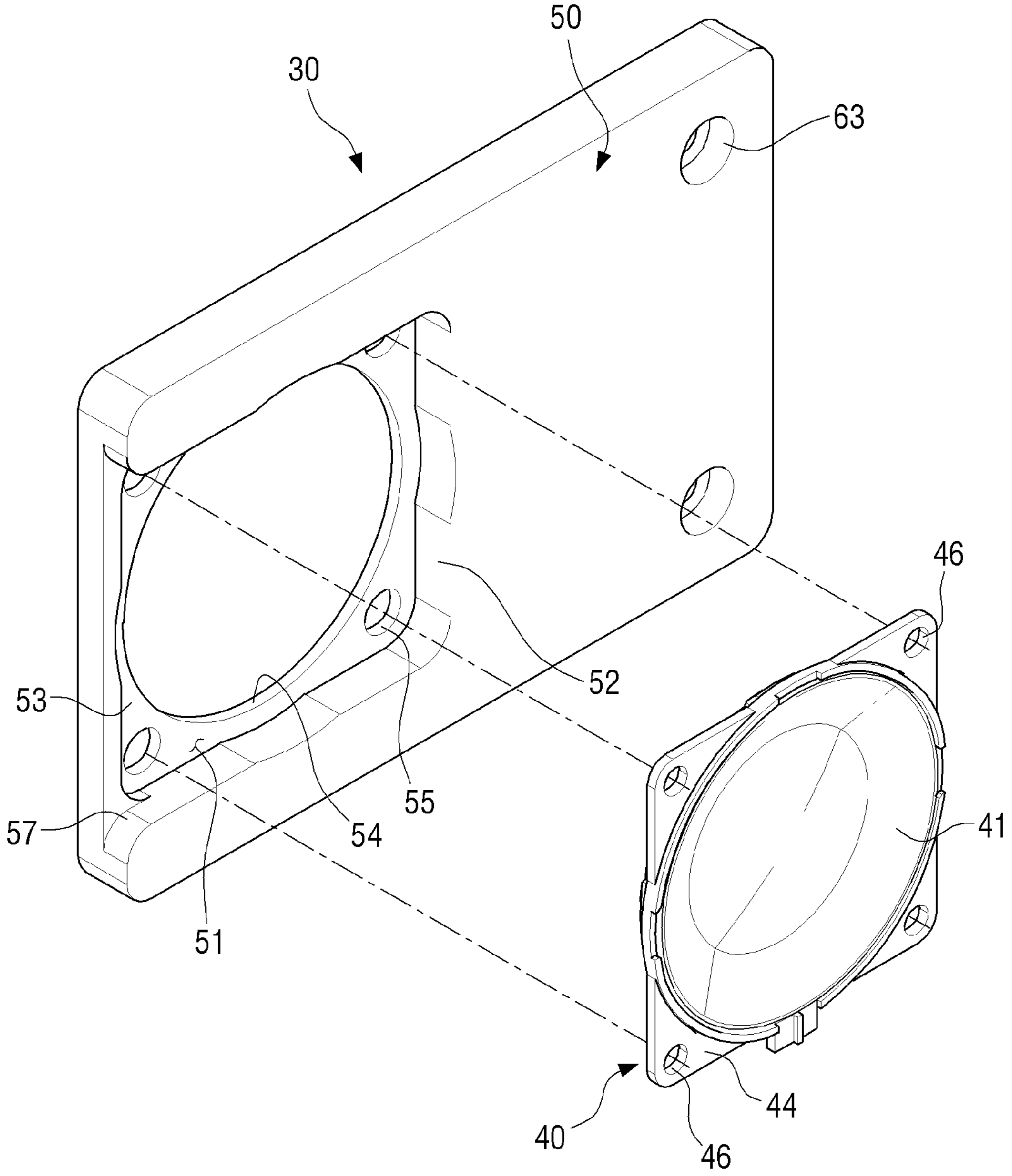
FIG. 8 is an exploded perspective view illustrating the slim speaker of FIG. 6.

Referring to FIGS. 6 to 8, the slim speaker 30 according to an embodiment of the disclosure may include an acoustic transducer 40 and an enclosure 50.

The acoustic transducer 40 is configured to generate a sound according to a signal output from the main board (not illustrated) of the electronic device 1. The acoustic transducer 40 may include a diaphragm 41, a voice coil (not illustrated), a permanent magnet (not illustrated), and a fixing frame 44.

The diaphragm 41 is fixed to the fixing frame 44 and vibrates by the voice coil and the permanent magnet to generate a sound. The fixing frame 44 is formed in a substantially square shape, and a fixing groove **44*a* in which the diaphragm 41 is fixed is formed in the center of the fixing frame 44. In this embodiment, because the diaphragm 41 is formed in a circular shape, a circular fixing groove 44*a* is formed in the center of the fixing frame 44. In other words, the diaphragm 41 is disposed in the center of the front surface of the fixing frame 44** to be able to vibrate.

A protruding portion 47 is provided on the rear surface of the fixing frame 44. The voice coil (not illustrated) and the permanent magnet (not illustrated) for vibrating the diaphragm 41 are disposed inside the protruding portion 47. A plurality of openings 49 through which a sound generated by the rear surface of the diaphragm 41 is emitted when the diaphragm 41 vibrates are provided on the outer circumferential surface of the protruding portion 47. The plurality of openings 49 may be formed to be spaced apart from each other at regular intervals in the circumferential direction of the protruding portion 47. Accordingly, the plurality of openings 49 may be provided in a circular shape on the rear surface of the fixing frame 44, that is, the rear surface of the acoustic transducer 40.

The fixing frame 44 may be disposed in the enclosure 50. To this end, a plurality of fastening holes 46 are provided at the corners of the fixing frame 44. The plurality of fastening holes 46 are formed to correspond to a plurality of fixing holes 55 provided in the enclosure 50. The fixing frame 44 may be fixed to the enclosure 50 by using fastening elements such as screws and bolts, the plurality of fastening holes 46, and the plurality of fixing holes 55. In other words, the acoustic transducer 40 may be fixed to the enclosure 50 with the plurality of fastening elements. In this embodiment, four fastening holes 46 are provided in the fixing frame 44, but the number of fastening holes 46 is not limited thereto.

As another example, the fixing frame 44 may be fixed to the enclosure 50 with another fixing member such as an adhesive. In other words, the acoustic transducer 40 may be fixed to the enclosure 50 with an adhesive.

The enclosure 50 may be formed to surround the acoustic transducer 40 and to be fixed to the rear cover 20. The enclosure 50 is formed in a substantially rectangular shape, and has a sound guide groove 51 provided on the front surface thereof and an enclosure groove 60 provided on the rear surface thereof.

The sound guide groove 51 is formed on the front surface of the enclosure 50 so that the upper side and one side of the sound guide groove 51 are open. The diaphragm 41 of the acoustic transducer 40 is exposed through the sound guide groove 51. The sound guide groove 51 is provided to guide the sound generated by the diaphragm 41. In detail, the sound guide groove 51 is formed as a groove having a substantially rectangular cross-section and a bottom surface 53 lower than the front surface of the enclosure 50. Accordingly, the sound guide groove 51 includes a side wall 52 extending from the front surface of the enclosure 50 toward the rear side and the bottom surface 53 covering the side wall 52. The side wall 52 of the sound guide groove 51 is formed such that one side thereof is open and three sides thereof are closed.

One open side of the sound guide groove 51 forms a sound emission port 57 for emitting the sound generated by the acoustic transducer 40. Accordingly, the sound emission port 57 is formed on the side surface of the enclosure 50 and communicates with the sound guide groove 51.

As illustrated in FIG. 8, a through hole 54 in which the acoustic transducer 40 is disposed is provided on the bottom surface 53 of the sound guide groove 51. In addition, the plurality of fixing holes 55 are provided on the bottom surface 53 around the through hole 54. The plurality of fixing holes 55 are provided to correspond to the plurality of fastening holes 46 of the fixing frame 44 of the acoustic transducer 40. In this embodiment, four fixing holes 55 are provided on the bottom surface 53 of the sound guide groove 51.

The enclosure groove 60 is formed to have a predetermined depth on the rear surface of the enclosure 50. The enclosure groove 60 is formed to surround the acoustic transducer 40. Accordingly, the enclosure groove 60 forms an enclosure space surrounding the entire circumference of the acoustic transducer 40. The enclosure groove 60 has an open upper side and is formed in a shape corresponding to the shape of the enclosure 50. As illustrated in FIG. 7, because the enclosure 50 has a substantially rectangular shape, the enclosure groove 60 is also formed in a substantially rectangular shape.

The enclosure groove 60 is formed on the entire rear surface of the enclosure 50 so as to have as large a volume as possible. Accordingly, the side surface of the enclosure 50 forms the side wall 61 of the enclosure groove 60, and the front surface of the enclosure 50 forms the bottom surface 62 of the enclosure groove 60. The thickness of the side wall 61 and the bottom surface 62 of the enclosure groove 60 may be made as thin as possible. Then, the volume of the enclosure groove 60 may be made as large as possible. Accordingly, the side wall 52 of the sound guide groove 51 formed on the front surface of the enclosure 50 protrudes into the enclosure groove 60, that is, the enclosure space.

The upper side of the enclosure groove 60 is open. The upper side of the enclosure groove 60 may be covered by the rear cover 20. In other words, the enclosure 50 may be disposed so that the rear surface of the enclosure 50 in which the enclosure groove 60 is formed contacts the rear cover 20. Then, the enclosure groove 60 and the rear cover 20 form the enclosure space surrounding the acoustic transducer 40. In this case, the volume of the enclosure space covered by the rear cover 20 may be determined by the output of the acoustic transducer 40.

In addition, when the acoustic transducer 40 is disposed in the enclosure 50, the rear end 48 of the acoustic transducer 40 protrudes into the enclosure groove 60. In other words, the rear end 48 of the acoustic transducer 40 is formed to protrude from the rear surface of the enclosure 50. Accordingly, the height from the front surface of the enclosure 50 to the rear end 48 of the acoustic transducer 40 is higher than the height from the front surface of the enclosure 50 to the rear surface of the enclosure 50.

In this case, the height at which the rear end 48 of the acoustic transducer 40 protrudes from the rear surface of the enclosure 50 may be determined by the rear cover 20. In detail, as illustrated in FIG. 5, the protruding height of the rear end 48 of the acoustic transducer 40 may be determined so that when the enclosure groove 60 is covered with the rear cover 20, the rear end 48 of the acoustic transducer 40 and the outer surface of the rear cover 20 form the same plane.

The enclosure 50 may include a plurality of fixing grooves 63. Referring to FIG. 6, the enclosure 50 includes two fixing grooves 63 that are provided on the opposite side of the sound guide groove 51 and spaced apart from each other by a predetermined distance. The two fixing grooves 63 are formed to fix the enclosure 50 to the rear cover 20.

As another example, the enclosure 50 may be formed to include a duct 69.

Figure 9:
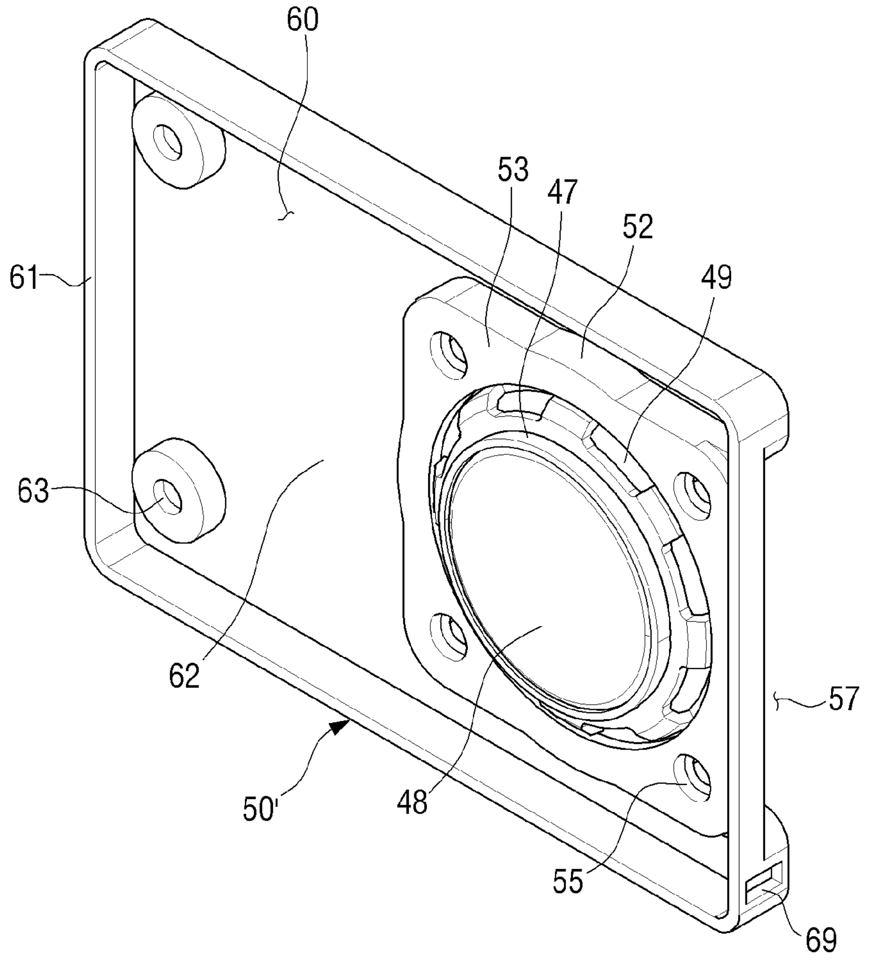
FIG. 9 is a perspective view illustrating another example of a slim speaker.

FIG. 9 is a perspective view illustrating another example of a slim speaker having a duct provided in an enclosure.

Referring to FIG. 9, the duct 69 is formed on the side surface of the enclosure 50 on one side of the sound emission port 57 and communicates with the enclosure space formed by the enclosure groove 60. Accordingly, the sound generated by the rear surface of the diaphragm 41 and emitted to the enclosure space may be emitted from the side surface of the enclosure 50 through the duct 69.

The rear cover 20 may include a through hole 21 through which the rear end 48 of the acoustic transducer 40 disposed in the enclosure 50 is inserted and exposed. Accordingly, when the acoustic transducer 40 is fixed to the rear cover 20 by the enclosure 50, the rear cover 20 and the rear end 48 of the acoustic transducer 40 are located on the same plane. In detail, when the acoustic transducer 40 is disposed on the rear cover 20, the outer surface of the rear cover 20 and the outer surface of the rear end 48 of the acoustic transducer 40 are located on the substantially same plane.

When the through hole 21 into which the rear end 48 of the acoustic transducer 40 is inserted is formed in the rear cover 20 and the rear end 48 of the acoustic transducer 40 is inserted into the through hole 21, the thickness of the electronic device 1 may be reduced as much as the thickness of the rear cover 20.

When the slim speaker 30 is disposed on the rear cover 20, the sound emission port 57 of the enclosure 50 may be arranged to face the lower side, the left side, or the right side of the electronic device 1.

In the case of the embodiment illustrated in FIG. 3, the two slim speakers 30 disposed on the lower side of the rear cover 20, that is, the first and second slim speakers 30-1 and 30-2, are disposed so that the sound emission ports 57 face the left side and the right side, respectively. In other words, the sound emission port 57 of the first slim speaker 30-1 is disposed to face the right side of the rear cover 20, and the sound emission port 57 of the second slim speaker 30-2 is disposed to face the left side of the rear cover 20. The third slim speaker 30-3 is disposed such that the sound emission port 57 faces the left side of the rear cover 20 in the same way as the second slim speaker 30-2.

Accordingly, when the electronic device 1 is in the position shown in FIG. 1, that is, when the display 11 is in the portrait mode, the first and second slim speakers 30-1 and 30-2 operate to output sound. Accordingly, the sound is emitted to the outside through the left side surface and the right side surface of the electronic device 1.

However, when the electronic device 1 rotates 90 degrees from the state of FIG. 1 so that the second and third slim speakers 30-2 and 30-3 face downward, that is, when the display 11 is in the landscape mode, the first slim speaker 30-1 does not work, and the only the second and third slim speakers 30-2 and 30-3 operate. Accordingly, the sound is output downward from the left and right sides of the lower surface of the electronic device 1.

A plurality of first fixing protrusions **26*b* corresponding to the plurality of fixing grooves 63 of the enclosure 50 may be provided on the rear cover 20. Each of the plurality of first fixing protrusions 26*b*** has a screw hole having a female screw formed thereon.

Accordingly, the plurality of fixing grooves 63 of the enclosure 50 are aligned with the plurality of first fixing protrusions **26*b* of the rear cover 20 and fastening elements 32 such as screws or bolts are fastened to the plurality of screw holes, so that the enclosure 50 may be fixed to the rear cover 20**.

In addition, a plurality of second fixing protrusions 26*a* corresponding to the plurality of fixing holes 55 provided in the sound guide groove 51 of the enclosure 50 may be provided on the rear cover 20. Accordingly, the plurality of second fixing protrusions 26*a* are provided around the through hole 21 of the rear cover 20. Each of the plurality of second fixing protrusions 26*a* has a screw hole having a female screw formed thereon.

Accordingly, the plurality of fixing holes 55 of the sound guide groove 51 of the enclosure 50 are aligned with the plurality of second fixing protrusions 26*a* of the rear cover 20 and fastening elements such as screws or bolts passing the fastening holes 46 of the fixing frame 44 of the acoustic transducer 40 and the fixing holes 55 of the sound guide groove 51 are fastened to the screw holes of the plurality of second fixing protrusions 26*a*, so that the enclosure 50 and the acoustic transducer 40 may be fixed to the rear cover 20.

In the above description, the case in which the enclosure 50 and the acoustic transducer 40 are fixed to the rear cover 20 using screws or bolts has been illustrated and described with reference to FIG. 4. However, as another example, although not illustrated, the enclosure 50 and the acoustic transducer 40 may be fixed to the rear cover 20 using an adhesive.

In addition, the acoustic transducer 40 shown in FIGS. 6 to 8 is only an example, and the shape of the acoustic transducer 40 is not limited thereto. As another example, although not illustrated, the diaphragm 41 of the acoustic transducer 40 may be formed in a rectangular shape.

A speaker accommodating portion 71 in which the slim speaker 30 disposed on the rear cover 20 is accommodated may be provided on the rear surface of the case 10. The speaker accommodating portion 71 may be formed as a concave groove having the shape and size corresponding to the enclosure 50 of the slim speaker 30.

In this embodiment, because three slim speakers 30 are disposed on the rear cover 20, three speaker accommodating portions 71 in which the three slim speakers 30 disposed on the rear cover 20 are accommodated are provided on the rear surface of the case 10 as illustrated in FIG. 2. The speaker accommodating portions 71 may be formed in a component positioned inside the rear surface of the case 10, for example, in the rear chassis 70 supporting the display 11.

A sound outlet 15 through which the sound from the slim speaker 30 is emitted may be provided on the side surface of the case 10. In detail, the sound outlets 15 communicating with the sound emission ports 57 of the enclosures 50 are provided on the side surfaces 13 and 14 of the case 10 facing the sound emission ports 57 of the enclosures 50. Accordingly, the sound emission port 57 of the enclosure 50 and the sound outlet 15 of the case 10 face each other. The sound outlet 15 may be formed as a plurality of holes 15*a*. For example, as illustrated in FIG. 1, the sound outlet 15 may be formed as a plurality of holes 15*a* arranged in a straight line on the side surface 13 of the case 10.

When the rear cover 20 is coupled to the case 10, the three slim speakers 30 disposed on the rear cover 20 are accommodated in the speaker accommodating portion 71 of the case 10.

In this case, because the slim speaker 30 is disposed so that the enclosure groove 60 faces the rear cover 20, the sound guide groove 51 of the enclosure 50 faces the speaker accommodating portion 71 of the case 10. Accordingly, as illustrated in FIG. 5, the sound guide groove 51 of the enclosure 50 is covered by the speaker accommodating portion 71 of the component positioned inside the rear surface of the case 10, for example, by the speaker accommodating portion 71 of the rear chassis 70.

Accordingly, when the diaphragm 41 of the acoustic transducer 40 vibrates to generate sound, the sound moves to the speaker accommodating portion 71 of the rear chassis 70 of the case 10. Then, the sound collides with the speaker accommodating portion 71 of the rear chassis 70, and moves to the sound emission port 57 along the sound guide groove 51. Some of the sound generated by the diaphragm 41 may move directly to the sound emission port 57 along the sound guide groove 51. In other words, the sound guide groove 51 of the enclosure 50 and the speaker accommodating portion 71 of the rear chassis 70 form a sound emission passage for guiding the sound generated by the diaphragm 41 to the sound emission port 57.

Because the sound emission port 57 of the enclosure 50 communicates with the sound outlet 15 of the case 10, the sound generated by the acoustic transducer 40 is emitted to the outside of the electronic device 1 through the sound outlet 15.

When the diaphragm 41 vibrates, a sound is also generated at the rear side of the diaphragm 41. The sound generated at the rear side of the diaphragm 41 is emitted into the enclosure space 66 formed of the enclosure groove 60 surrounding the acoustic transducer 40 and the rear cover 20 covering the upper side of the enclosure groove 60 through the plurality of openings 49 of the fixing frame 44 supporting the diaphragm 41, and then is extinguished.

In the above description, the case in which three slim speakers 30 are disposed on the rear cover 20 has been described, but the number of slim speakers 30 disposed on the rear cover 20 is not limited thereto.

In the above-described embodiment, the electronic device 1 has a structure in which the electronic device 1 is disposed to be rotatable by 90 degrees on a rotation base 100. In detail, a rotation ring 29 is provided on the rear cover 20 of the electronic device 1, and the rotation ring 29 is disposed to be rotatably supported with respect to the rotation base 100. Then, the electronic device 1 may rotate 90 degrees with respect to the rotation base 100.

In this case, a controller (not illustrated) of the electronic device 1 may be configured to detect the posture of the electronic device 1 and to operate two slim speakers 30 positioned on the left and right sides of the electronic device 1 among the three slim speakers 30. For example, when the screen of the electronic device 1 is in the portrait mode as illustrated in FIG. 1, the controller controls the three slim speakers 30 so that the first and second slim speakers 30-1 and 30-2 located at the lower side operate, but the third slim speaker 30-3 does not operate. Conversely, when the screen of the electronic device 1 is in the landscape mode, the controller controls the three slim speakers 30 so that the second and third slim speakers 30-2 and 30-3 located at the lower side operate, but the first slim speaker 30-1 does not operate.

Accordingly, when it is not necessary to rotate the electronic device 1, only two slim speakers 30 may be disposed on the rear cover 20. For example, in FIG. 3, only the first and second slim speakers 30-1 and 30-2 located on the lower side may be disposed on the rear cover 20, and the third slim speaker 30-3 may not be disposed on the rear cover 20.

In the above description, the slim speaker 30 is disposed on the rear cover 20 so that the enclosure groove 60 is covered by the rear cover 20 and the diaphragm 41 of the acoustic transducer 40 faces the speaker accommodating portion 71 of the case 10. However, as another example, the slim speaker 30 may be disposed on the rear cover 20 in the opposite direction.

Hereinafter, an example of an electronic device in which the slim speaker 30 is disposed in the opposite direction will be described in detail with reference to FIGS. 10 to 12.

Figure 10:
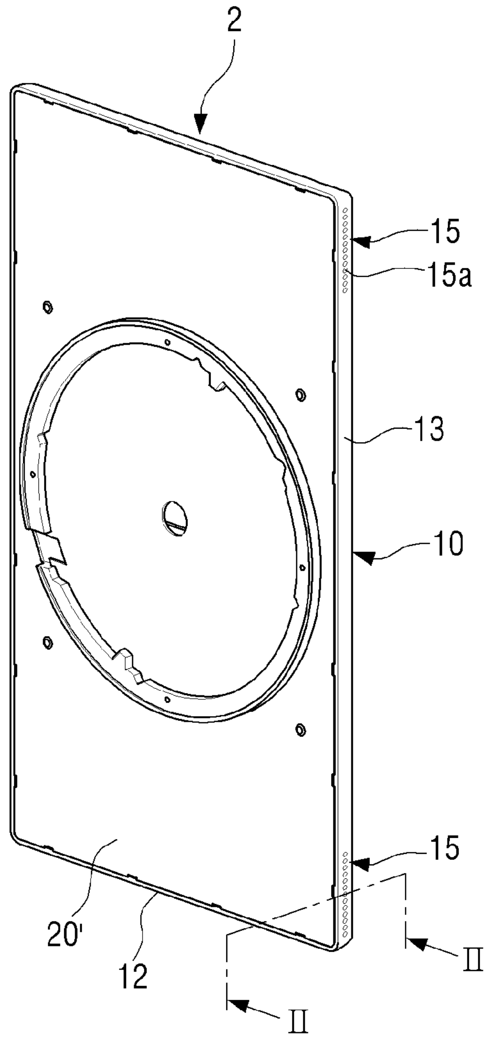
FIG. 10 is a perspective view illustrating an electronic device having a slim speaker according to another embodiment.

FIG. 10 is a perspective view illustrating an electronic device having a slim speaker according to another embodiment. FIG. 11 is a partial cross-sectional view illustrating the electronic device having a slim speaker taken along line II-II in FIG. 10. FIG. 12 is an exploded perspective view illustrating a state in which a rear cover is separated from the electronic device having a slim speaker of FIG. 10.

Figure 11:
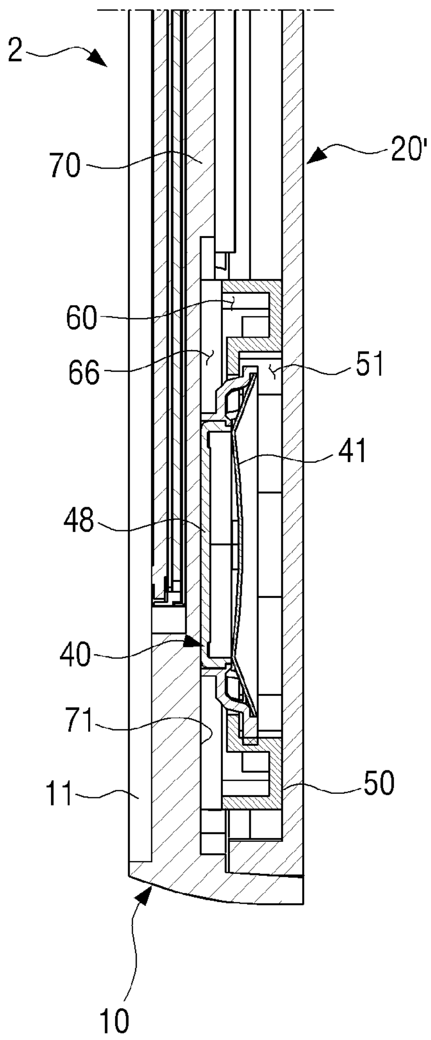
FIG. 11 is a partial cross-sectional view illustrating the electronic device having a slim speaker taken along line II-II in FIG. 10.
Figure 12:
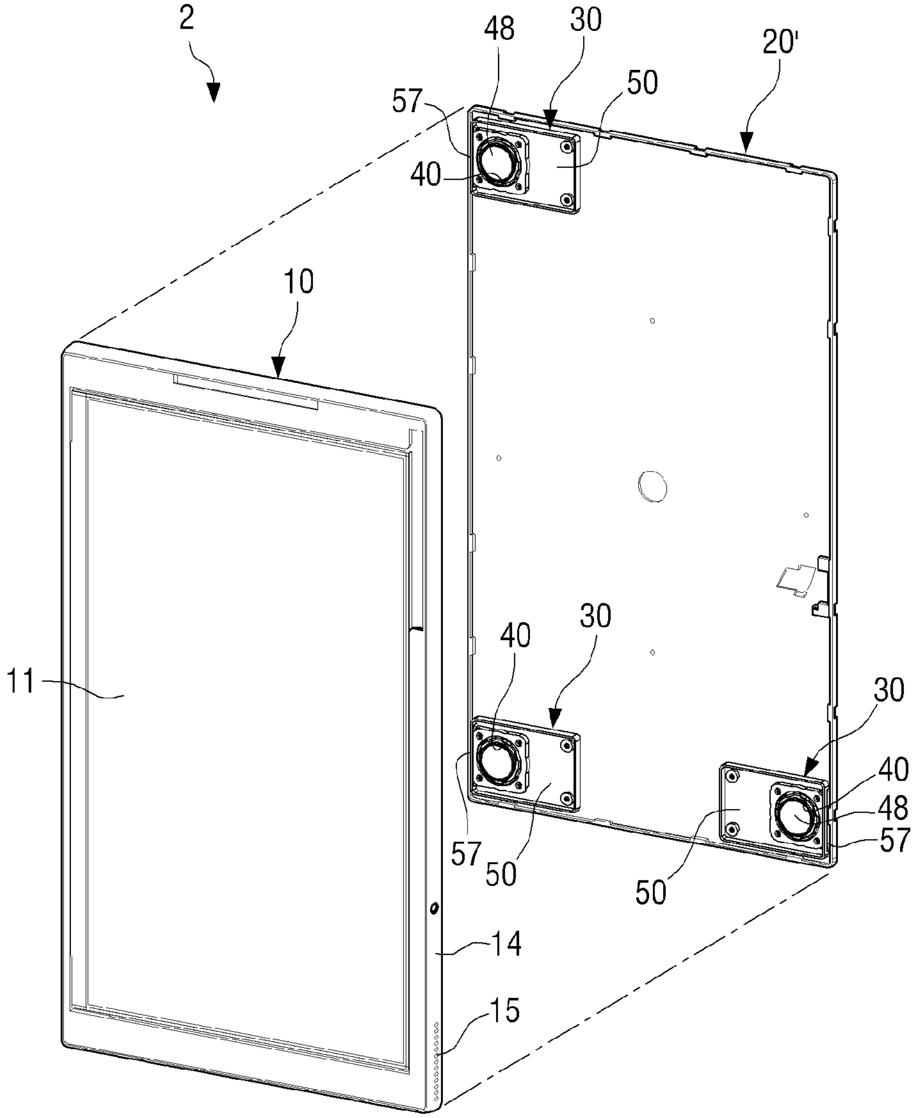
FIG. 12 is an exploded perspective view illustrating a state in which a rear cover is separated from the electronic device having a slim speaker of FIG. 10.

Referring to FIGS. 10 to 12, an electronic device 2 having a slim speaker according to an embodiment may include a case 10, a slim speaker 30, and a rear cover 20'.

The case 10 may include a display 11 disposed on the front surface thereof. A rear chassis 70 supporting the display 11 is provided inside the case 10. A main board, a power board, etc. included in the electronic device 2, for example, a tablet computer, may be disposed in the rear chassis 70.

The slim speaker 30 is configured to reproduce the sound output by the electronic device 2, and is disposed on the rear surface of the case 10. The front surface of the slim speaker 30 is provided with an opening for emitting a sound generated by an acoustic transducer 40, and the rear surface of the slim speaker 30 forming an enclosure 50 is open, so that the thickness of the electronic device 1 may be reduced. The slim speaker 30 is the same as the slim speaker 30 of the above-described embodiment; therefore, a detailed description thereof is omitted.

The rear cover 20' is disposed on the rear surface of the case 10 and is provided to cover the slim speaker 30. Accordingly, because the slim speaker 30 disposed inside the rear surface of the case 10 is covered by the rear cover 20', the slim speaker 30 is not exposed to the outside.

The slim speaker 30 may be fixed to the rear cover 20'. In this embodiment, as illustrated in FIG. 12, three slim speakers 30 are disposed on the rear cover 20'.

As illustrated in FIG. 11, the slim speaker 30 is disposed such that the sound guide groove 51 formed on the front surface of the enclosure 50 faces the rear cover 20'. In other words, the enclosure 50 is disposed so that the upper side of the sound guide groove 51 is covered by the rear cover 20'. Accordingly, the enclosure groove 60 formed on the rear surface of the enclosure 50 faces the rear chassis 70 inside the case 10. In this case, the rear cover 20' does not have the through hole 21 into which the rear end 48 of the acoustic transducer 40 is inserted, unlike the rear cover 20 of the above-described embodiment.

The rear end 48 of the acoustic transducer 40 protruding into the enclosure groove 60 faces the rear chassis 70. Accordingly, the rear chassis 70 is provided with a speaker accommodating portion 71 capable of accommodating the rear end 48 of the acoustic transducer 40 and sealing the enclosure groove 60.

In this embodiment, because three slim speakers 30 are disposed on the rear cover 20', the rear surface of the case 10 is proved with three speaker accommodating portions 71 in which the three slim speakers 30 disposed on the rear cover 20' are accommodated. The speaker accommodating portions 71 may be formed in a component positioned inside the rear surface of the case 10, for example, in the rear chassis 70 supporting the display.

A sound outlet 15 through which the sound from the slim speaker 30 is emitted may be provided on the side surfaces 13 and 14 of the case 10. In detail, the sound outlets 15 communicating with the sound emission ports 57 of the enclosures 50 are provided on the side surfaces 13 and 14 of the case 10 facing the sound emission ports 57 of the enclosures 50. Accordingly, the sound emission port 57 of the enclosure 50 and the sound outlet 15 of the case 10 face each other. The sound outlet 15 may be formed as a plurality of holes **15*a*. For example, as illustrated in FIG. 10, the sound outlet 15 may be formed as a plurality of holes 15*a* arranged in a straight line on the side surface 13 of the case 10**.

When the rear cover 20' is coupled to the case 10, the three slim speakers 30 disposed on the rear cover 20' are accommodated in the speaker accommodating portion 71 of the case.

In this case, because the slim speaker 30 is disposed so that the sound guide groove 51 of the enclosure 50 faces the rear cover 20' as illustrated in FIG. 11, the enclosure groove 60 faces the speaker accommodating portion 71 of the case 10 and the sound guide groove 51 of the enclosure 50 is covered by the rear cover 20'.

Accordingly, when the diaphragm 41 of the acoustic transducer 40 vibrates to generate sound, the sound moves toward the rear cover 20'. Then, the sound collides with the rear cover 20' and moves to the sound emission port 57 along the sound guide groove 51. Some of the sound generated by the diaphragm 41 may move directly to the sound emission port 57 along the sound guide groove 51 without colliding with the rear cover 20'. In other words, the sound guide groove 51 of the enclosure 50 and the rear cover 20' form a sound emission passage for guiding the sound generated by the diaphragm 41 to the sound emission port 57.

Because the sound emission port 57 of the enclosure 50 communicates with the sound outlet 15 of the case 10, the sound generated by the acoustic transducer 40 is emitted to the outside of the electronic device 2 through the sound outlet 15.

In the above description, a tablet computer has been described as an example of the electronic device 1 in which the slim speaker 30 is disposed. However, the electronic device 1 according to an embodiment of the disclosure is not limited thereto. The electronic device 1 having a slim speaker according to an embodiment of the disclosure may include a control panel used in various home appliances such as a washing machine, an air conditioner, a refrigerator, a microwave oven, an electric oven, a gas oven, an air purifier, and the like.

Hereinafter, as another example of the electronic device 1 having a slim speaker, a control panel provided in a home appliance will be described. Hereinafter, a microwave oven will be described as an example of the home appliance.

Figure 13:
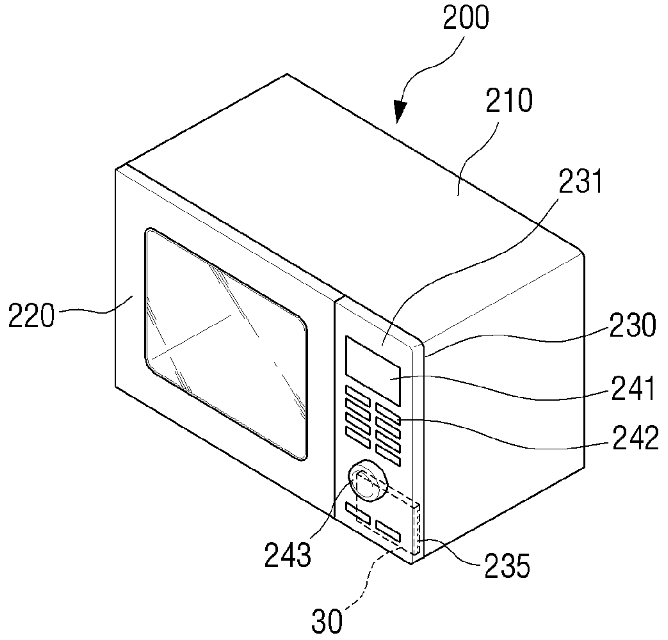
FIG. 13 is a perspective view illustrating an electronic device having a slim speaker according to another embodiment.
Figure 14:
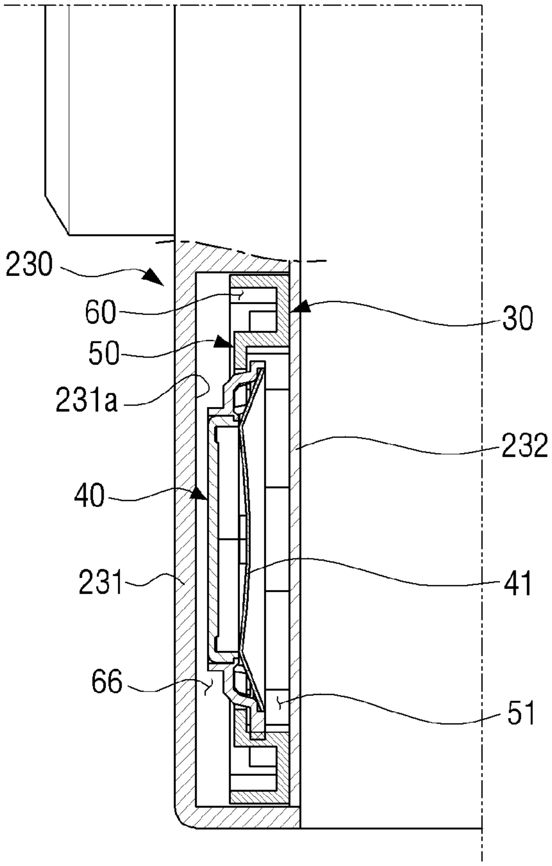
FIG. 14 is partial cross-sectional view illustrating a control panel of the electronic device having a slim speaker of FIG. 13.

FIG. 13 is a perspective view illustrating a microwave oven as an electronic device having a slim speaker according to another embodiment. FIG. 14 is a partial cross-sectional view illustrating a control panel of the microwave oven of FIG. 13.

Referring to FIG. 13, a microwave oven 200 according to an embodiment of the disclosure may include a main body 210 forming a cooking chamber in which food to be cooked is accommodated, a door 220 disposed on the front surface of the main body 210 to open and close the cooking chamber, and a control panel 230 disposed on one side of the door 220 on the front surface of the main body 210.

The configuration and operation of the main body 210, the cooking chamber, and the door 220 are the same as or similar to those of a conventional microwave oven, and thus detailed descriptions thereof are omitted.

The control panel 230 is configured to control the microwave oven, and may include a case 231 and a rear cover 232 disposed on the rear surface of the case 231.

A display 241, a plurality of control buttons (or control switches) 242, and a dial switch 243 may be disposed on the front surface of the case 231.

The display 241 may include a 7-segment light emitting diode (LED) display or a liquid crystal display (LCD) display capable of displaying numbers or characters indicating a cooking time, a state of the microwave oven, and the like.

The plurality of control buttons 242 are provided to select various cooking functions such as automatic cooking, defrosting, warming, keeping warm, and the like.

The dial switch 243 is provided so that the user may adjust the cooking time by rotating the dial switch 243.

A circuit board (not illustrated) on which the display 241, the plurality of control buttons 242, and the dial switch 243 are disposed may be provided inside the case 231.

In addition, a processor (not illustrated) configured to control the microwave oven 200 according to commands input through the plurality of control buttons 242 and the dial switch 243 may be disposed on the circuit board. The processor may control the display 241 to output status information of the microwave oven 200.

In order to maximize the volume of the cooking chamber while maintaining the size of the main body 210, it is preferable to make the thickness of the control panel 230 as thin as possible. To this end, the control panel 230 according to an embodiment of the disclosure may include a slim speaker 30.

The slim speaker 30 may be disposed inside the case 231. The slim speaker 30 may output information related to the operation of the microwave oven 200 as sound under the control of the processor. In order to implement stereo, two slim speakers 30 may be provided. The slim speaker 30 is the same as the slim speaker 30 of the electronic device 1 according to the above-described embodiment; therefore, a detailed description thereof is omitted.

A sound outlet 235 communicating with the sound emission port 57 of the slim speaker 30 is provided on the side surface of the case 231. Accordingly, the sound generated by the slim speaker 30 is emitted to the outside of the case 231 through the sound outlet 235.

Referring to FIG. 14, the slim speaker 30 is disposed in the case 231 so that the sound guide groove 51 provided on the front surface of the enclosure 50 faces the rear cover 232. In other words, the enclosure 50 is disposed so that the upper side of the sound guide groove 51 is covered by the rear cover 232. Then, the upper side of the enclosure groove 60 is covered by the inner surface 231*a* of the case 231. In this case, the enclosure 50 may be fixed to the rear cover 232 or the inside of the case 231.

Accordingly, the sound guide groove 51 and the rear cover 232 form a sound emitting passage for discharging sound to the outside, and the enclosure groove 60 and the inner surface of the case 231 form an enclosure space 66.

When the processor of the control panel 230 operates the acoustic transducer 40, the diaphragm 41 vibrates to generate sound. The sound generated from the front side of the diaphragm 41 is guided to the sound emission port 57 by the sound guide groove 51 formed on the front surface of the enclosure 50 and the rear cover 232 covering the sound guide groove 51, and is emitted to the outside of the control panel 230 through the sound outlet 235.

The sound generated from the rear side of the diaphragm 41 of the acoustic transducer 40 is propagated to the enclosure space 66 formed by the enclosure groove 60 and the inner surface 231*a* of the case 231, and is extinguished.

In FIGS. 13 and 14, the case in which the slim speaker is disposed in the control panel of the microwave oven has been described, but the disclosure is not limited thereto. As another example, the slim speaker may be disposed in a control panel of another home appliance, for example, a control panel of a washing machine, a control panel of an air conditioner, a control panel of a refrigerator, a control panel of a dryer, a control panel of a clothes managing apparatus, and the like.

As described above, in an electronic device having a slim speaker according to an embodiment of the disclosure, the upper side of the sound guide groove formed on the front surface of the enclosure and the upper side of the enclosure groove formed on the rear surface of the enclosure are open, so that the thickness of the slim speaker may be reduced compared to the speaker according to the prior art in which the upper side of the sound guide groove and the upper side of the enclosure groove are closed.

Hereinafter, an acoustic transducer according to an embodiment of the disclosure will be described in detail with reference to FIGS. 15 to 18.

Figure 15:
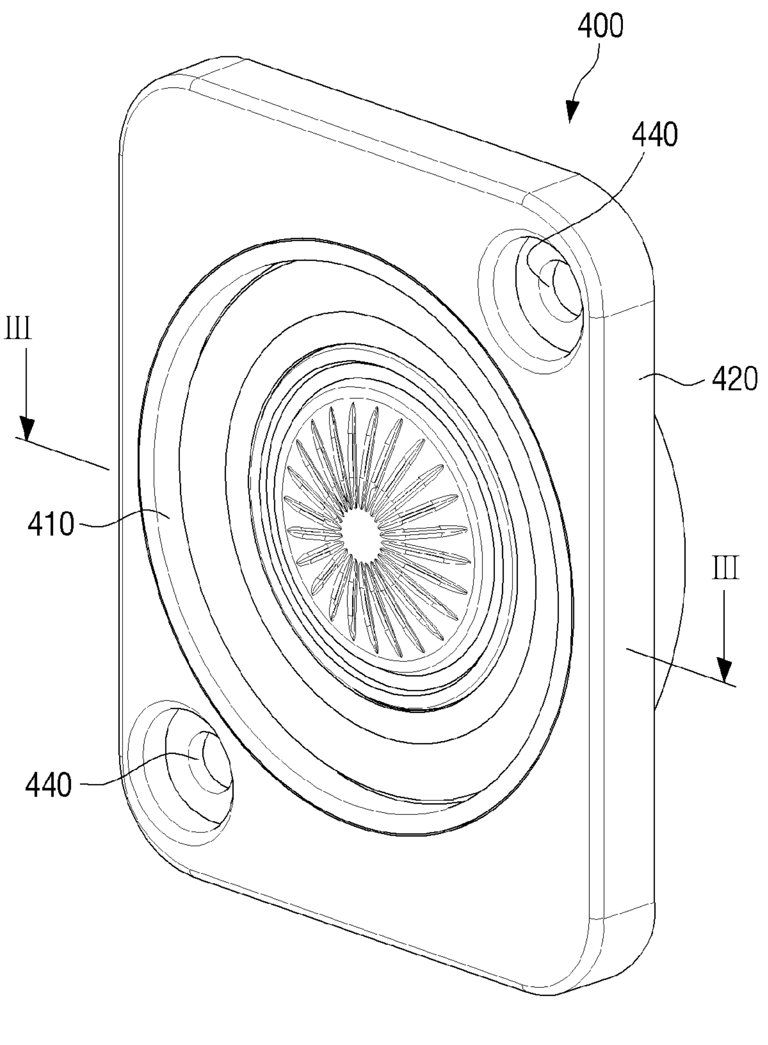
FIG. 15 is a perspective view illustrating an acoustic transducer according to an embodiment.
Figure 16:
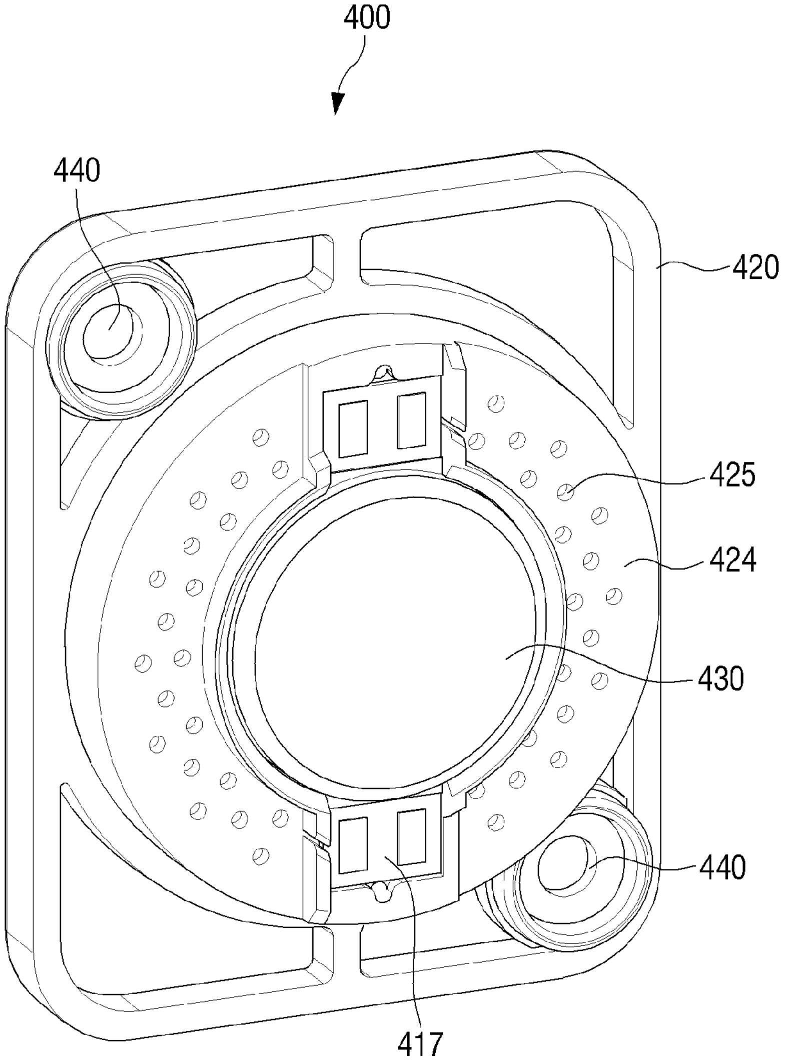
FIG. 16 is a rear perspective view illustrating the acoustic transducer of FIG. 15.
Figure 17:
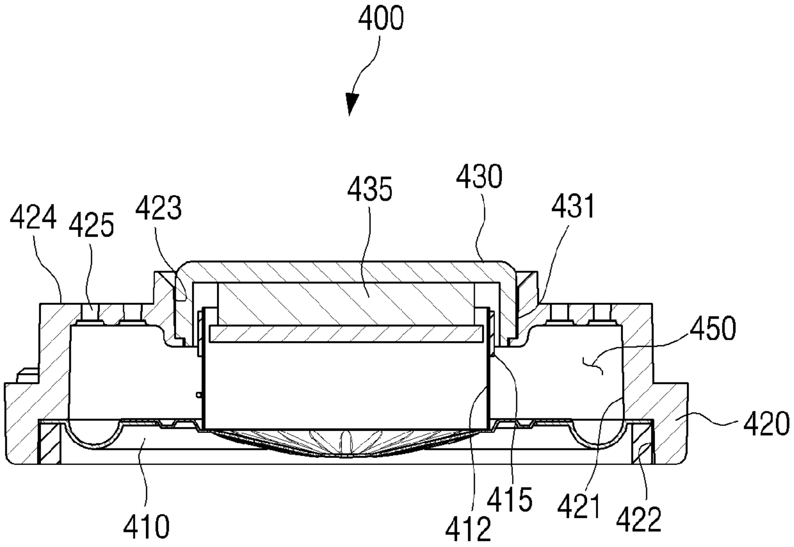
FIG. 17 is a cross-sectional view illustrating the acoustic transducer of FIG. 15 taken along line III-III.
Figure 18:
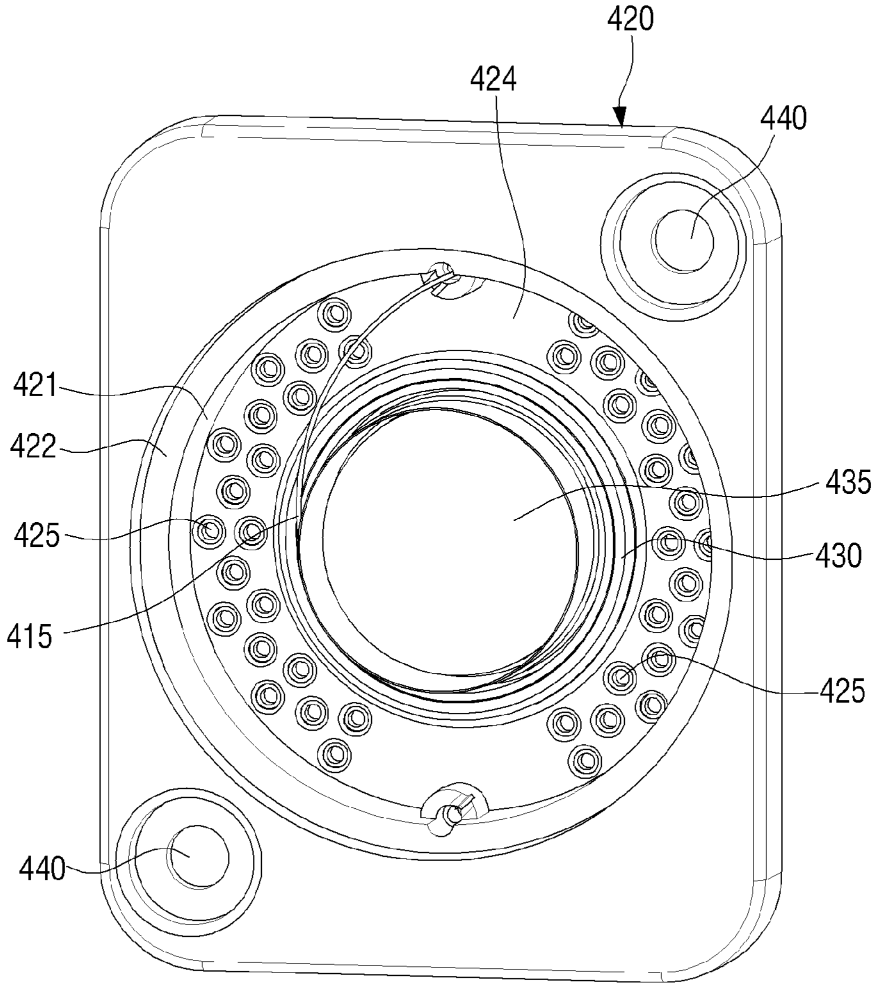
FIG. 18 is a perspective view illustrating the acoustic transducer of FIG. 15 from which a diaphragm is removed.

FIG. 15 is a perspective view illustrating an acoustic transducer according to an embodiment. FIG. 16 is a rear perspective view illustrating the acoustic transducer of FIG. 15. FIG. 17 is a cross-sectional view illustrating the acoustic transducer of FIG. 15 taken along line FIG. 18 is a perspective view illustrating the acoustic transducer of FIG. 15 from which a diaphragm is removed.

Referring to FIGS. 15 to 18, an acoustic transducer 400 according to an embodiment of the disclosure may include a diaphragm 410, a frame 420, and a yoke 430.

The diaphragm 410 is fixed to the frame 420 and vibrates by a voice coil 415 and a permanent magnet 435 to generate sound.

The diaphragm 410 is formed in a substantially disk shape, and the voice coil 415 is disposed on one surface of the diaphragm 410.

In detail, the voice coil 415 is disposed in the center of one surface of the diaphragm 41 facing the permanent magnet 435 to move integrally with the diaphragm 41. To this end, the voice coil 415 may be provided at one end of a bobbin 412 fixed to one surface of the diaphragm 410. A sound signal current may be applied to the voice coil 415.

The yoke 430 is disposed on the frame 420, and the permanent magnet 435 for operating the voice coil 415 is disposed on the yoke 430. The yoke 430 may be formed to surround the permanent magnet 435. The yoke 430 may be formed of a magnetic metal.

The voice coil 415 may be positioned between the permanent magnet 435 and the yoke 430. Accordingly, when a current is applied to the voice coil 415, the voice coil 415 forms a magnetic field, and the diaphragm 410 moves back and forth by interaction with the permanent magnet 435 disposed on the yoke 430 to generate a sound.

The frame 420 is formed to fix the diaphragm 410 and the yoke 430. In addition, the frame 420 may be formed to shield the rear side of the diaphragm 410 so that the sound generated at the front side of the diaphragm 410 is isolated from the sound generated at the rear side of the diaphragm 410.

For example, the frame 420 may have a rectangular flat plate shape and include an accommodating groove 421 in which the diaphragm 410 is disposed. The accommodating groove 421 is formed in a shape and size corresponding to the diaphragm 410 in the center of the front surface of the frame 420. In this embodiment, because the diaphragm 410 is circular, the accommodating groove 421 is also formed as a circular groove.

The accommodating groove 421 is formed to have a predetermined depth so that the diaphragm 410 may vibrate, that is, move back and forth.

A fixing groove 422 to which the diaphragm 410 is fixed is provided at the upper end of the accommodating groove 421. The fixing groove 422 is formed as a circular groove having a larger diameter than the diameter of the accommodating groove 421. When the edge of the diaphragm 410 is fixed to the fixing groove 422, the diaphragm 410 may vibrate up and down with respect to the accommodating groove 421.

The yoke 430 is disposed on the bottom 424 of the accommodating groove 421 facing one surface of the diaphragm 410.

For example, a through hole 423 into which the yoke 430 is inserted may be formed in the center of the bottom 424 of the accommodating groove 421. The yoke 430 is inserted into and fixed to the through hole 423 of the accommodating groove 421. The yoke 430 may be formed in a circular container shape with a flat bottom. Accordingly, the through hole 423 provided in the accommodating groove 421 may be formed in a circular shape.

The permanent magnet 435 is disposed inside the yoke 430. In other words, the permanent magnet 435 may be disposed on the bottom surface of the yoke 430. The permanent magnet 435 may be formed in a disk shape. The permanent magnet 435 may be arranged inside the voice coil 415. In other words, the voice coil 415 may be positioned between the side wall 431 of the yoke 430 and the permanent magnet 435. Accordingly, the voice coil 415 may move up and down with respect to the permanent magnet 435.

The accommodating groove 421 of the frame 420 may be formed to give a damping effect to the diaphragm 410.

In detail, in the case in which the accommodating groove 421 of the frame 420 is sealed, when the diaphragm 410 vibrates, the air in the inner space 450 of the accommodating groove 421 contracts and expands, so that the excessive forward and backward of the diaphragm 410 may be prevented and the diaphragm 410 may return to the original position of the diaphragm 410 within a short time. As described above, the effect of air in the inner space of the accommodating groove 421 of the frame 420 against the forward and backward movement of the diaphragm 410 is referred to as the damping effect of the accommodating groove 421.

However, when the accommodating groove 421 is completely sealed, the internal temperature of the accommodating groove 421 increase due to the forward and backward movement of the diaphragm 410 and the voice coil 415. Then, the voice coil 415 located inside the accommodating groove 421 may be damaged by the high temperature, so that the lifespan of the acoustic transducer 400 may be reduced. Accordingly, a plurality of discharge holes 425 may be formed in the accommodating groove 421 to prevent the temperature inside the accommodating groove 421 from increasing.

The plurality of discharge holes 425 may be formed to face the diaphragm 410 in the bottom 424 of the accommodating groove 421 around the yoke 430. The plurality of discharge holes 425 may be formed in a size such that the accommodating groove 421 gives the damping effect to the diaphragm 410. In detail, the plurality of discharge holes 425 may be formed as small as possible so that the accommodating groove 421 provides the damping effect to the diaphragm 410, and at the same time, the plurality of discharge holes 425 limit the increase in the temperature inside the accommodating groove 421. When the size of the plurality of discharge holes 425 is too large, the accommodating groove 421 of the frame 420 may not give the damping effect to the diaphragm 410.

Terminals 417 may be provided on the outer surface of the bottom 424 of the accommodating groove 421 of the frame 420 to apply a current to the voice coil 415. When a current is applied to the voice coil 415 through the terminals 417, the diaphragm 410 vibrates by the voice coil 415 and the permanent magnet 435 to generate sound.

The inventor conducted experiments to determine the size and number of the plurality of discharge holes 425 that may maximize the performance of the acoustic transducer 400.

First, an experiment was performed to determine the diameter of the discharge hole 425. In detail, in a state where the number of discharge holes 425 is kept constant, an experiment was performed to compare the output of the acoustic transducer 400 while changing the diameter of the discharge holes 425.

Figure 19:
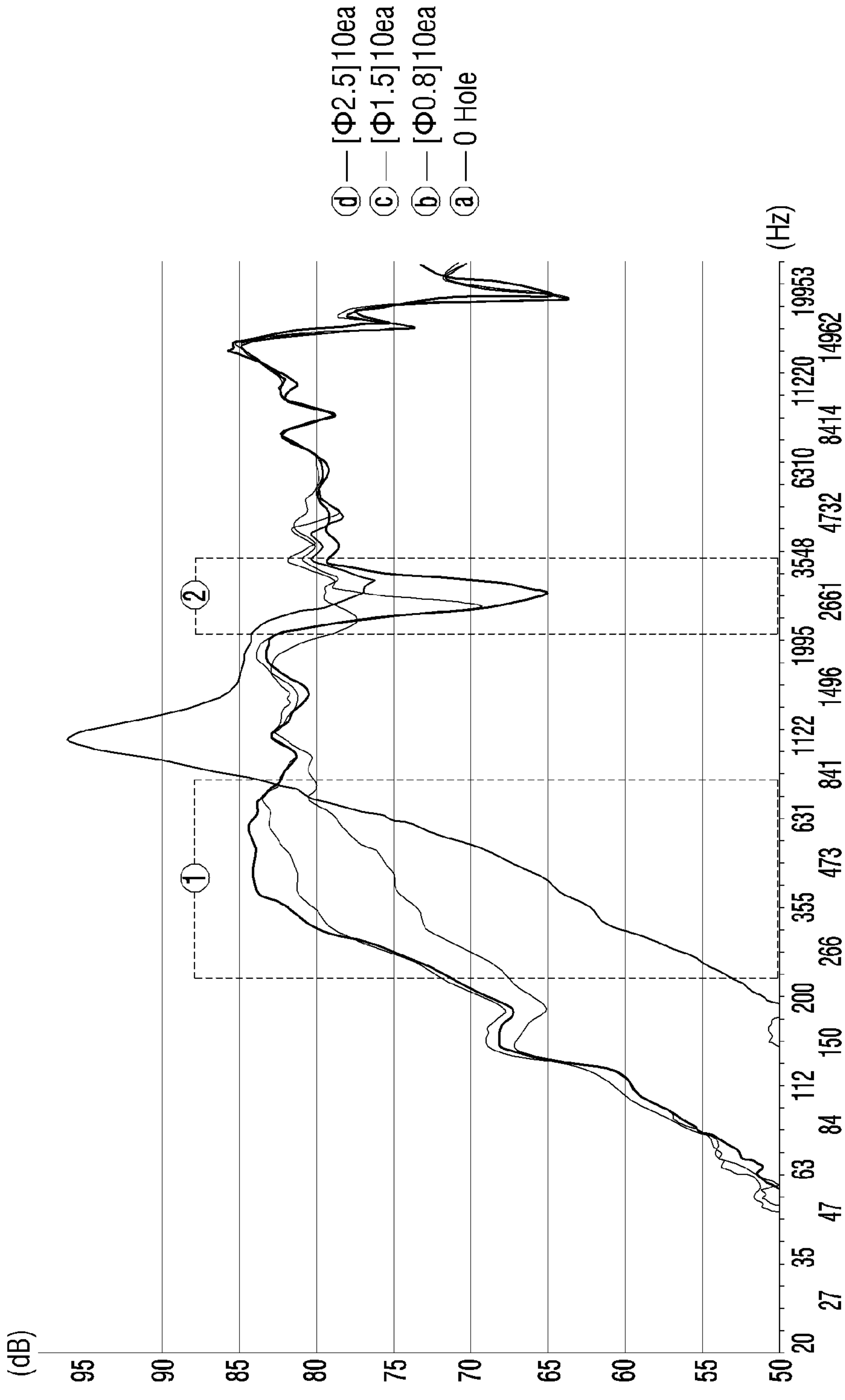
FIG. 19 is a graph illustrating output according to the size of discharge holes when the number of discharge holes of the acoustic transducer of FIG. 15 is kept constant.

FIG. 19 is a graph illustrating output according to the size of discharge holes when the number of discharge holes of the acoustic transducer of FIG. 15 is kept constant. In this case, the Y-axis of the graph represents the output dB, and the X-axis represents the frequency Hz.

On the other hand, the diameter of the diaphragm 410 of the acoustic transducer 400 used in the experiment is 25 mm, and the number of discharge holes 425 is ten.

Referring to FIG. 19, when there is no discharge hole 425 in the accommodating groove 421 of the frame 420, the output (curve (a)) of the acoustic transducer 400 is a peak in about 1 kHz band, and there is almost no output in the low frequency range, which is a region (1).

When the diameter of the discharge hole 425 is 0.8 mm, the output (curve (b)) of the acoustic transducer 400 increases in the low frequency range, which is the region (1), and the overall performance of the acoustic transducer 400 is improved.

When the diameter of the discharge hole 425 is 1.5 mm, the output (curve (c)) of the acoustic transducer 400 increases in the region (1), but a deep dip occurred in the region (2) where the frequency is about 2.5 kHz adversely affects the performance of the acoustic transducer 400.

In addition, when the diameter of the discharge hole 425 is 2.0 mm, the output (curve (d)) of the acoustic transducer 400 increases in the region (1), but a deeper dip occurs in the region (2) than when the diameter of the discharge holes 425 is 1.5 mm. It adversely affects the performance of the acoustic transducer 400.

From the above results, it may be seen that when the size of the discharge holes 425 is too large, the force for suppressing the reciprocating motion of the diaphragm 410 in the accommodating groove 421 of the frame 420 is weakened so that the output of the acoustic transducer 400 drops in the 2.5 kHz band. In other words, when the diameter of the discharge holes 425 is too large, the damping effect of the diaphragm 410 generated by the accommodating groove 421 of the frame 420 may be reduced.

The inventor repeats the above experiment, and confirms that when the diameter of the discharge hole 425 of the accommodating groove 421 of the frame 420 is 0.6 mm to 1.0 mm, the output of the acoustic transducer 400 in the region (1) increases and the dip of the acoustic transducer 400 is minimized in the region (2) so that the performance of the acoustic transducer 400 is improved.

Next, an experiment was performed to determine the number of discharge holes 425. In detail, in a state where the diameter of discharge hole 425 of the accommodating groove 421 is kept constant, an experiment was performed to compare the output of the acoustic transducer 400 while changing the number of the discharge holes 425.

Figure 20:
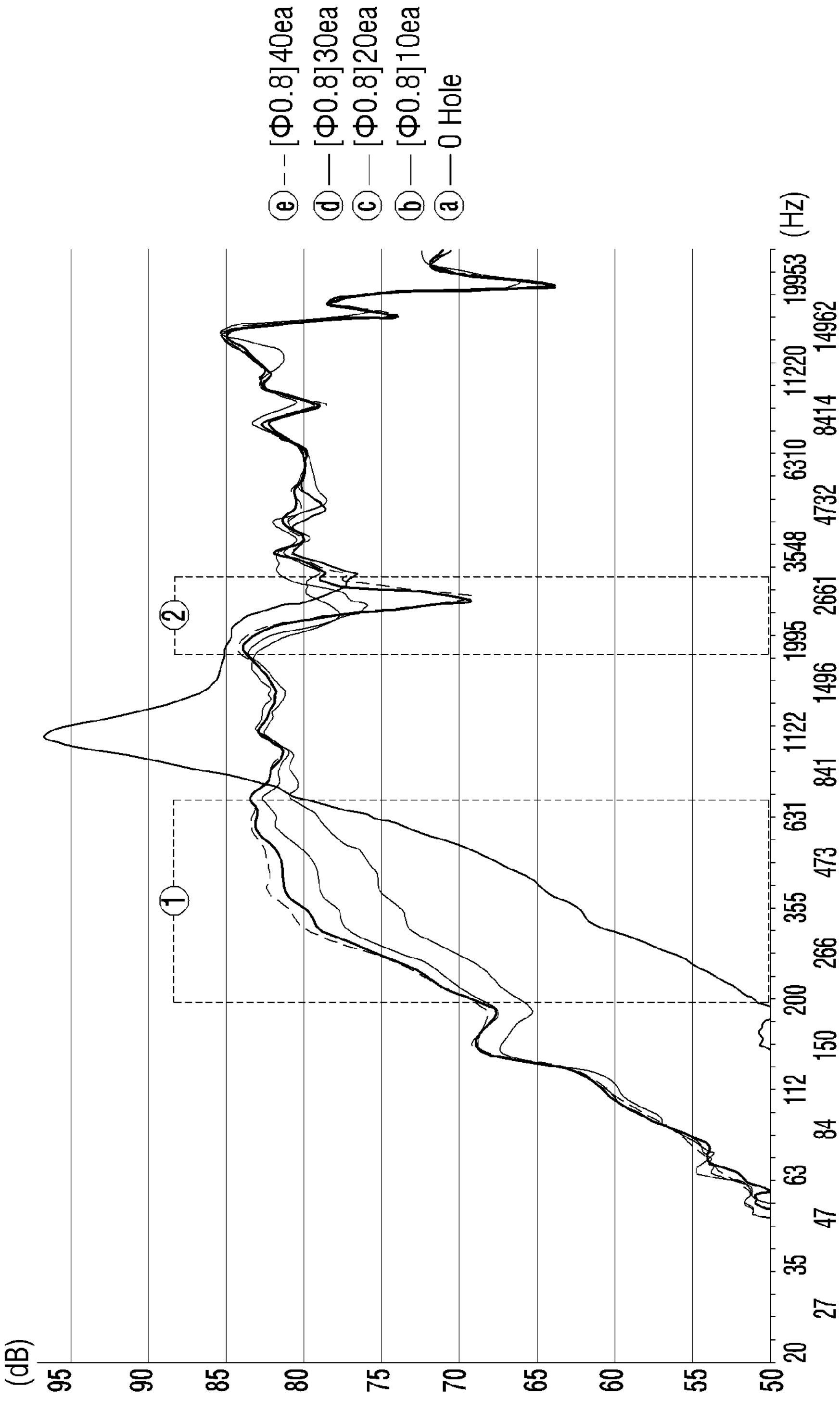
FIG. 20 is a graph illustrating output according to the number of discharge holes when the diameter of the discharge holes of the acoustic transducer of FIG. 15 is kept constant.

FIG. 20 is a graph illustrating output according to the number of discharge holes when the diameter of the discharge hole of the acoustic transducer of FIG. 15 is kept constant. In FIG. 20, the Y-axis of the graph represents the output dB, and the X-axis represents the frequency Hz.

On the other hand, the diameter of the diaphragm 410 of the acoustic transducer 400 used in the experiment is 25 mm, and the diameter of the discharge hole 425 is constant at 0.8 mm.

Referring to FIG. 20, when there is no discharge hole 425 in the accommodating groove 421 of the frame 420, the output (curve (a)) of the acoustic transducer 400 is a peak in about 1 kHz band, and there is almost no output in the low frequency range, which is a region (1).

When the number of the discharge holes 425 is ten, the output (curve (b)) of the acoustic transducer 400 increases in the low frequency range, which is the region (1), and the overall performance of the acoustic transducer 400 is improved.

When the number of the discharge holes 425 is twenty, the output (curve (c)) of the acoustic transducer 400 increases compared to the case where the number of discharge holes 425 is ten in the region (1), and a dip is slightly deeper than the case where the number of discharge holes 425 is ten in the region (2) where the frequency is about 2.5 kHz, so that the overall performance of the acoustic transducer 400 is better.

When the number of discharge holes 425 is thirty, the output (curve (d)) of the acoustic transducer 400 increases slightly than when the number of discharge holes 425 is twenty in the region (1), but a very deep dip occurs compared to the case where the number of discharge holes 425 is twenty in the region (2). It adversely affects the performance of the acoustic transducer 400.

In addition, when the number of discharge holes 425 is forty, the output (curve e) of the acoustic transducer 400 increases slightly than when the number of discharge holes 425 is thirty in the region (1), but a very deep dip occurs compared to the case where the number of discharge holes 425 is twenty in the region (2). It adversely affects the performance of the acoustic transducer 400.

From the above results, it may be seen that even when the diameter of the plurality of discharge holes 425 is small, when the number of discharge holes 425 increases, the air pressure inside the acoustic transducer 400, that is, the air pressure in the accommodating groove 421 of the frame 420 is weakened, so that a dip occurs in the region (2). Therefore, it may be seen that the diameter and number of the discharge holes 425 formed in the accommodating groove 421 of the frame 420 greatly affect the performance of the acoustic transducer 400.

From the graphs of FIGS. 19 and 20, in consideration of the performance in the low frequency range and the dip, the performance of the acoustic transducer 400 may be the best when twenty discharge holes 425 having a diameter of 0.8 mm are formed.

On the other hand, the number of discharge holes 425 formed in the accommodating groove 421 of the frame 420 may be expressed as an area ratio of the discharge holes 425 to the area of the diaphragm 410 as shown in Table 1 below.

TABLE 1

| | Size (mm) | number of holes | cross-sectional area (mm$^2$) | area ratio (%) |
|---|---|---|---|---|
| Diaphragm | 25 | | 490.87 | |
| discharge hole | 0.8 | 10 | 5.03 | 1.02 |
| | | 20 | 10.05 | 2.05 |
| | | 30 | 15.08 | 3.07 |
| | | 40 | 20.11 | 4.10 |

Here, the area ratio refers to the ratio of the total area of the plurality of discharge holes 425 to the area of the diaphragm 410. From Table 1 above, when the diameter of the discharge holes 425 is 0.8 mm and the number is twenty, the area ratio of the discharge holes 425 is about 2.05%.

The inventor repeats the above experiment, and confirms that when the area ratio of the discharge holes 425 of the accommodating groove 421 of the frame 420 is 2% to 2.2%, the output of the acoustic transducer 400 in the region (1) increases and the dip of the acoustic transducer 400 is minimized in the region (2) so that the performance of the acoustic transducer 400 is improved.

Accordingly, the performance of the acoustic transducer 400 according to an embodiment of the disclosure may be improved when the diameter of each of the plurality of discharge holes 425 formed on the accommodating groove 421 of the frame 420 is 0.6 mm to 1.0 mm and the area ratio thereof is 2% to 2.2%.

On the other hand, the frame 420 may include a plurality of fixing holes 440 to fix the acoustic transducer 400 to a home appliance.

In this embodiment, two fixing holes 440 are provided on the outside of the accommodating groove 421 in a diagonal direction. However, the number of fixing holes 440 is not limited thereto. As long as the acoustic transducer 400 may be fixed to the home appliance, three or more fixing holes 440 may be provided.

Electronic devices in which the acoustic transducer 400 according to an embodiment is disposed may include a tablet computer, a notebook computer, a robot cleaner, and the like.

The frame 420 may be formed by injecting plastic. When the frame 420 is formed by injecting plastic, the diameter of the discharge hole 425 may be finely processed to be 1 mm or less. As described above, when the plurality of fine discharge holes 425 are formed in the accommodating groove 421 of the frame 420, the frame 420 may generate a damping effect similar to that of the enclosure.

In the acoustic transducer 400 according to an embodiment of the disclosure having the structure as described above, because the accommodating groove 421 of the frame 420 may give a damping effect to the diaphragm 410, the performance of the acoustic transducer 400 may be improved without the enclosure.

In addition, because the acoustic transducer 400 according to an embodiment of the disclosure has the plurality of discharge holes 425 formed in the accommodating groove 421, it is possible to limit the increase in the internal temperature of the acoustic transducer 400.

The acoustic transducer 400 according to an embodiment of the disclosure described above may be used as the acoustic transducer 40 of the above-described slim speaker 30. When the acoustic transducer 400 according to this embodiment is used in the above-described slim speaker 30, the performance of the slim speaker 30 is further improved by the damping effect of the accommodating groove 421 of the frame 420.

The disclosure has been described above in an exemplary manner. The terms used herein are for the purpose of description and should not be construed in a limiting sense. Various modifications and variations of the disclosure are possible according to the above contents. Accordingly, unless otherwise stated, the disclosure may be practiced freely within the scope of the claims.

What is claimed is:

1. An acoustic transducer comprising:

a diaphragm provided with a voice coil;

a yoke provided with a permanent magnet configured to operate the voice coil; and a frame including an accommodating groove in which the diaphragm is disposed and a plurality of fixing holes, and formed by plastic injection, wherein a bottom of the accommodating groove of the frame is formed to face the diaphragm, and the yoke is disposed in a center of the bottom of the accommodating groove, wherein a plurality of discharge holes are formed to face the diaphragm around the yoke on the bottom of the accommodating groove, wherein the plurality of discharge holes include a size such that the accommodating groove gives a damping effect to the diaphragm, and wherein a diameter of each of the plurality of discharge holes of the accommodating groove of the frame is 0.6 mm to 1.0 mm.

2. The acoustic transducer of claim 1, wherein a number of the discharge holes formed in the accommodating groove of the frame is determined such that a total area of the plurality of discharge holes is 2% to 2.2% of an area of the diaphragm.

3. An electronic device having a slim speaker comprising:

a case;

a slim speaker disposed in the case; and a rear cover disposed on a rear surface of the case and configured to cover the slim speaker, wherein the slim speaker comprises:

an acoustic transducer including a diaphragm and configured to generate sound; and an enclosure in which the acoustic transducer is disposed, the enclosure fixed to the rear cover, wherein the enclosure comprises:

a sound guide groove formed on a front surface of the enclosure, the sound guide groove including an upper side that is open to expose the diaphragm of the acoustic transducer, and the sound guide groove configured to guide a sound generated by the diaphragm;

an enclosure groove formed on a rear surface of the enclosure, the enclosure groove including an upper side that is open, and the enclosure groove configured to surround the acoustic transducer; and a sound emission port formed on a side surface of the enclosure and configured to communicate with the sound guide groove, wherein the sound guide groove includes a side wall protruding into an enclosure space, and a bottom surface covering the side wall, and wherein the bottom surface includes a through hole in which the acoustic transducer is disposed.

4. The electronic device having a slim speaker of claim 3, wherein:

the enclosure is disposed so that the upper side of the sound guide groove is covered by the rear cover; and a sound generated from a front side of the diaphragm of the acoustic transducer is discharged to an outside of the slim speaker through the sound emission port and the sound guide groove covered by the rear cover.

5. The electronic device having a slim speaker of claim 3, wherein the enclosure is disposed so that the upper side of the enclosure groove is covered by the rear cover.

6. The electronic device having a slim speaker of claim 5, wherein the rear cover includes a through hole through which a rear end of the acoustic transducer is exposed.

7. The electronic device having a slim speaker of claim 5, wherein a plurality of openings are provided in a circular shape on the rear surface of the acoustic transducer.

8. The electronic device having a slim speaker of claim 5, wherein the case includes a display disposed in a front surface of the case, and the sound guide groove is covered by a rear chassis that is configured to support the display.

9. The electronic device having a slim speaker of claim 3, further comprising a sound outlet configured to communicate with the sound emission port, the sound outlet disposed on a side surface of the case facing the sound emission port of the enclosure.

10. The electronic device having a slim speaker of claim 3, further comprising:

a duct formed on a side surface of the enclosure on one side of the sound emission port, and configured to communicate with the enclosure space.

11. The electronic device having a slim speaker of claim 3, wherein the slim speaker comprises two slim speakers disposed to be space apart by a predetermined distance along one side surface of the electronic device.

12. An electronic device having a slim speaker comprising:

a case;

a rear cover disposed on a rear surface of the case; and a slim speaker d accommodated inside the case;

wherein the slim speaker comprises:

an acoustic transducer including a diaphragm and configured to generate sound; and an enclosure in which the acoustic transducer is disposed, the enclosure fixed to the rear cover, wherein the enclosure comprises:

a sound guide groove formed on a front surface of the enclosure, the sound guide groove including an upper side and one side that are open to expose the diaphragm of the acoustic transducer; and an enclosure groove formed on a rear surface of the enclosure, the enclosure groove including an upper side that is open, and the enclosure groove configured to surround the acoustic transducer, and wherein the sound guide groove includes a side wall protruding into an enclosure space, and a bottom surface covering the side wall, and wherein the bottom surface includes a through hole in which the acoustic transducer is disposed.

13. The electronic device having a slim speaker of claim 12, wherein the enclosure is disposed on the rear cover so that the rear surface on which the enclosure groove is formed contacts the rear cover.

14. An electronic device comprising:

a case;

a rear cover disposed on a rear surface of the case; and
a slim speaker accommodated inside the case;
wherein the slim speaker comprises:
an acoustic transducer configured to generate sound; and
an enclosure in which the acoustic transducer is disposed, the enclosure fixed to the rear cover,
wherein the acoustic transducer comprises:
a diaphragm provided with a voice coil;
a yoke provided with a permanent magnet configured to operate the voice coil; and
a frame including an accommodating groove in which the diaphragm is disposed and a plurality of fixing holes, and formed by plastic injection,
wherein a bottom of the accommodating groove of the frame is formed to face the diaphragm, and the yoke is disposed in a center of the bottom of the accommodating groove,
wherein a plurality of discharge holes are formed to face the diaphragm around the yoke on the bottom of the accommodating groove,
wherein the plurality of discharge holes include a size such that the accommodating groove gives a damping effect to the diaphragm, and
wherein a diameter of each of the plurality of discharge holes of the accommodating groove of the frame is 0.6 mm to 1.0 mm.

15. The electronic device of claim 14, wherein
a number of the discharge holes formed in the accommodating groove of the frame is determined such that a total area of the plurality of discharge holes is 2% to 2.2% of an area of the diaphragm.

* * * * *